United States Patent [19]

Jacobs et al.

[11] Patent Number: 5,671,387

[45] Date of Patent: Sep. 23, 1997

[54] METHOD OF AUTOMATICALLY ASSIGNING DEVICE ADDRESSES TO DEVICES COMMUNICATING OVER A COMMON DATA BUS

[75] Inventors: Russel J. Jacobs, Center Valley; Brett A. Pierce, Hellertown; Joel S. Spira, Coopersburg, all of Pa.

[73] Assignee: Lutron Electronics, Co., Inc., Coopersburg, Pa.

[21] Appl. No.: 554,680

[22] Filed: Nov. 7, 1995

Related U.S. Application Data

[62] Division of Ser. No. 753,811, Sep. 3, 1991, Pat. No. 5,467,266.

[51] Int. Cl.[6] .................................................. G06F 13/00
[52] U.S. Cl. ........................... 395/420; 395/728; 395/730; 395/732
[58] Field of Search .......................... 395/420, 728–732

[56] References Cited

U.S. PATENT DOCUMENTS

| | | | |
|---|---|---|---|
| 4,200,862 | 4/1980 | Campbell et al. | 340/310 |
| 4,689,786 | 8/1987 | Sidhu et al. | 370/94 |
| 4,899,274 | 2/1990 | Hansen et al. | 364/200 |
| 5,237,696 | 8/1993 | Best | 395/725 |

*Primary Examiner*—Jack B. Harvey
*Assistant Examiner*—John Travis
*Attorney, Agent, or Firm*—Ostrolenk, Faber, Gerb & Soffen, LLP

[57] ABSTRACT

A method of automatically assigning device addresses to devices communicating over a common data bus. Each of the devices may, for example, control an electrically operable system such as a panel assembly that can be disposed over a window opening to control the transmission of light, heat or air through the window and/or for producing different decorative scenes within a room. The method includes sending out a first, trial device address and waiting for an acknowledgement from all of the other devices connected to the data bus to determine whether another device acknowledges that first trial device address as its own. If an acknowledgement is received from any other device, a subsequent, different, trial address is transmitted over the data bus and further waiting ensues to check whether the second trial address has been previously assigned. This process is repeated until the device finds a previously unassigned device address which it then assigns to itself.

2 Claims, 16 Drawing Sheets

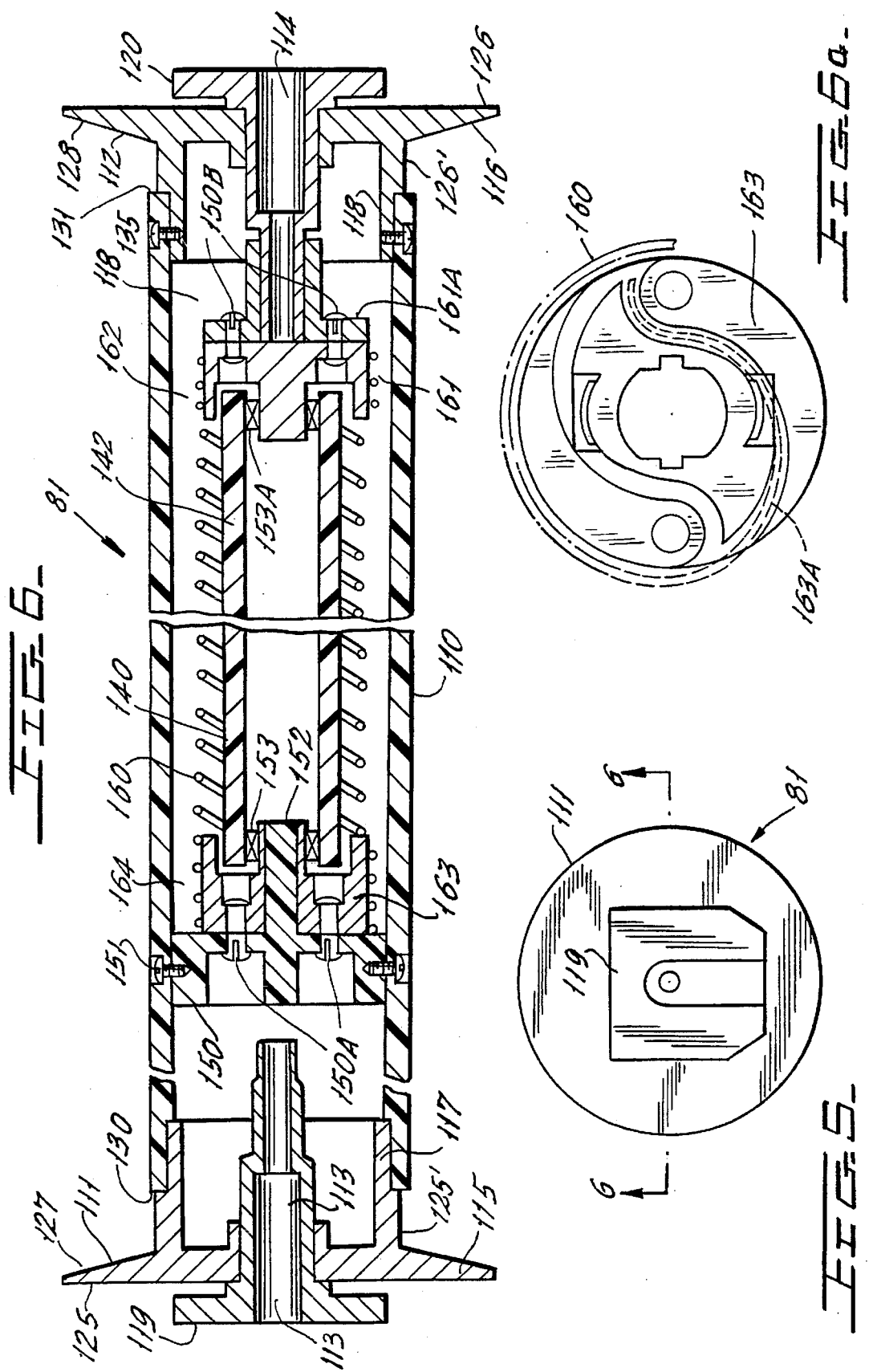

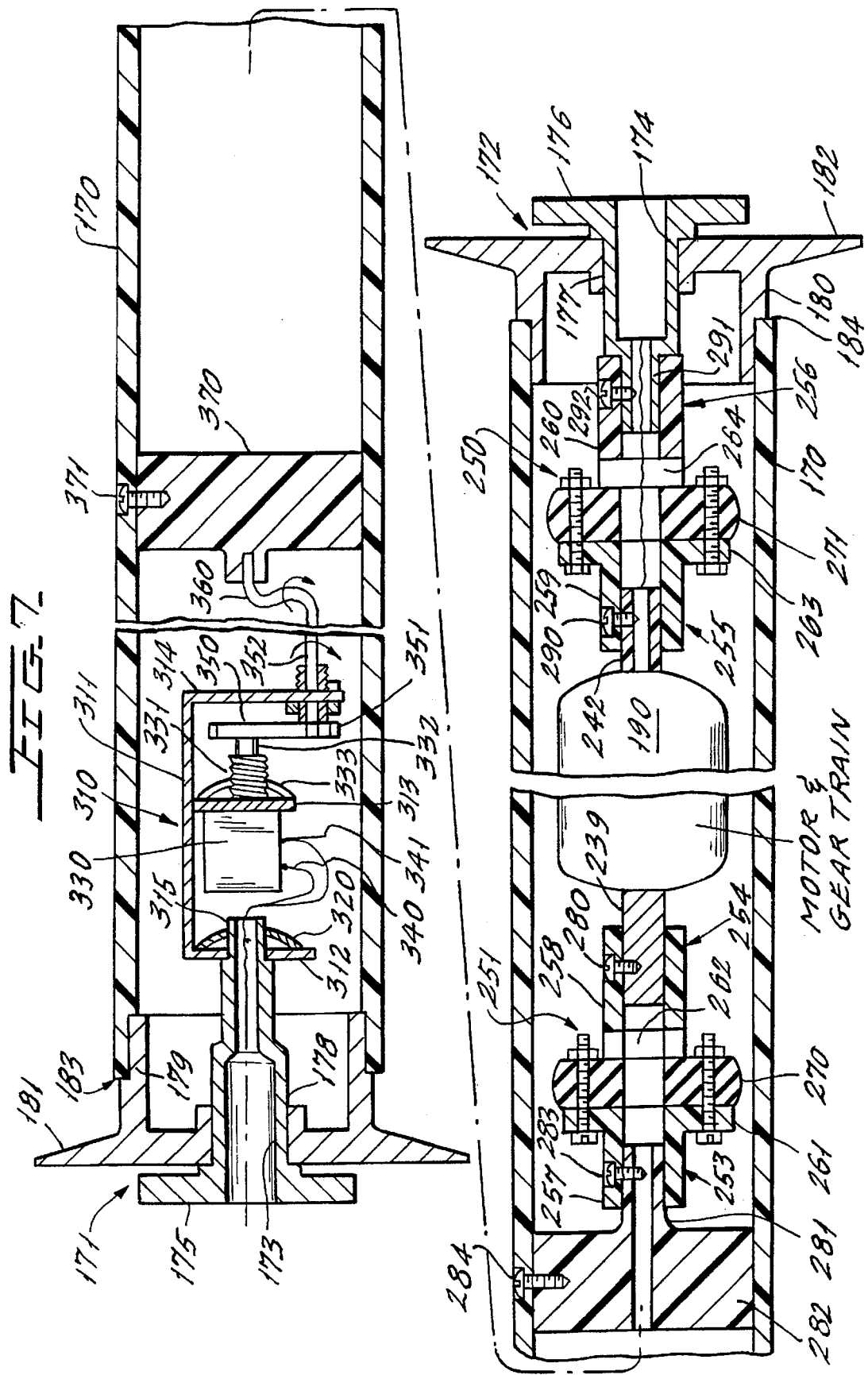

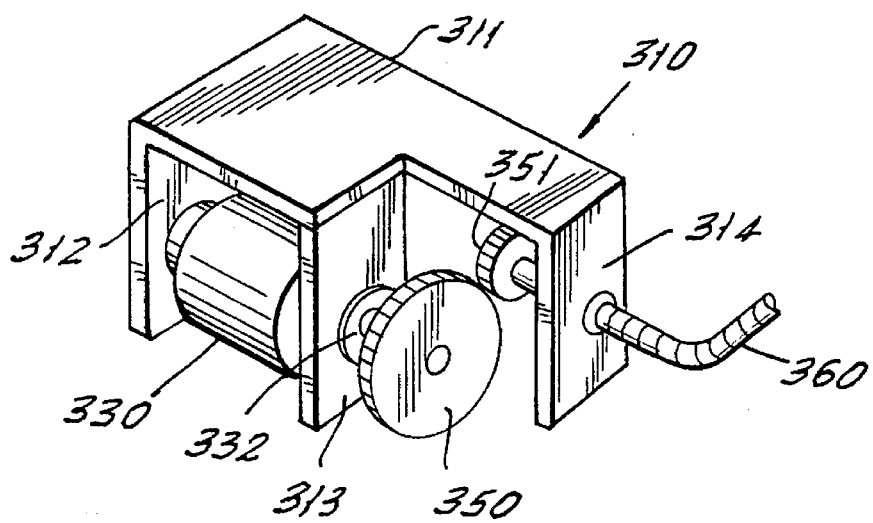
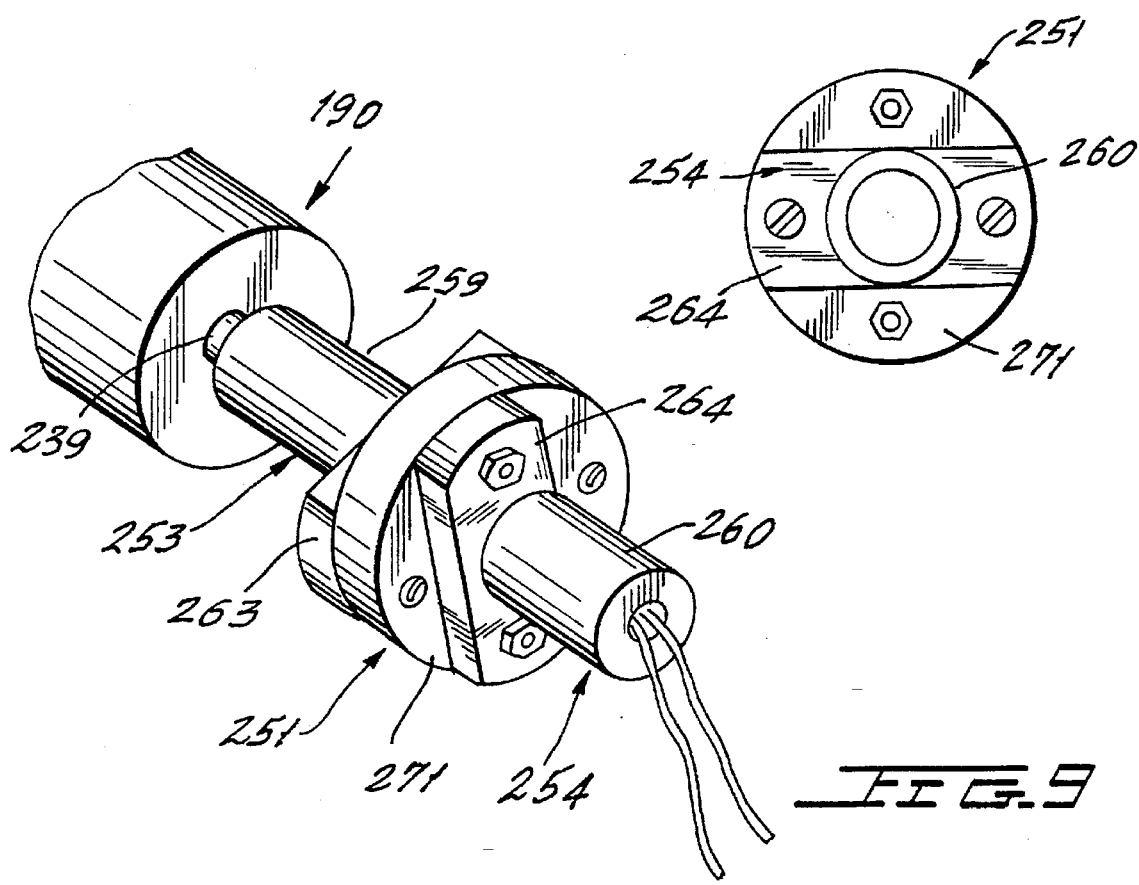

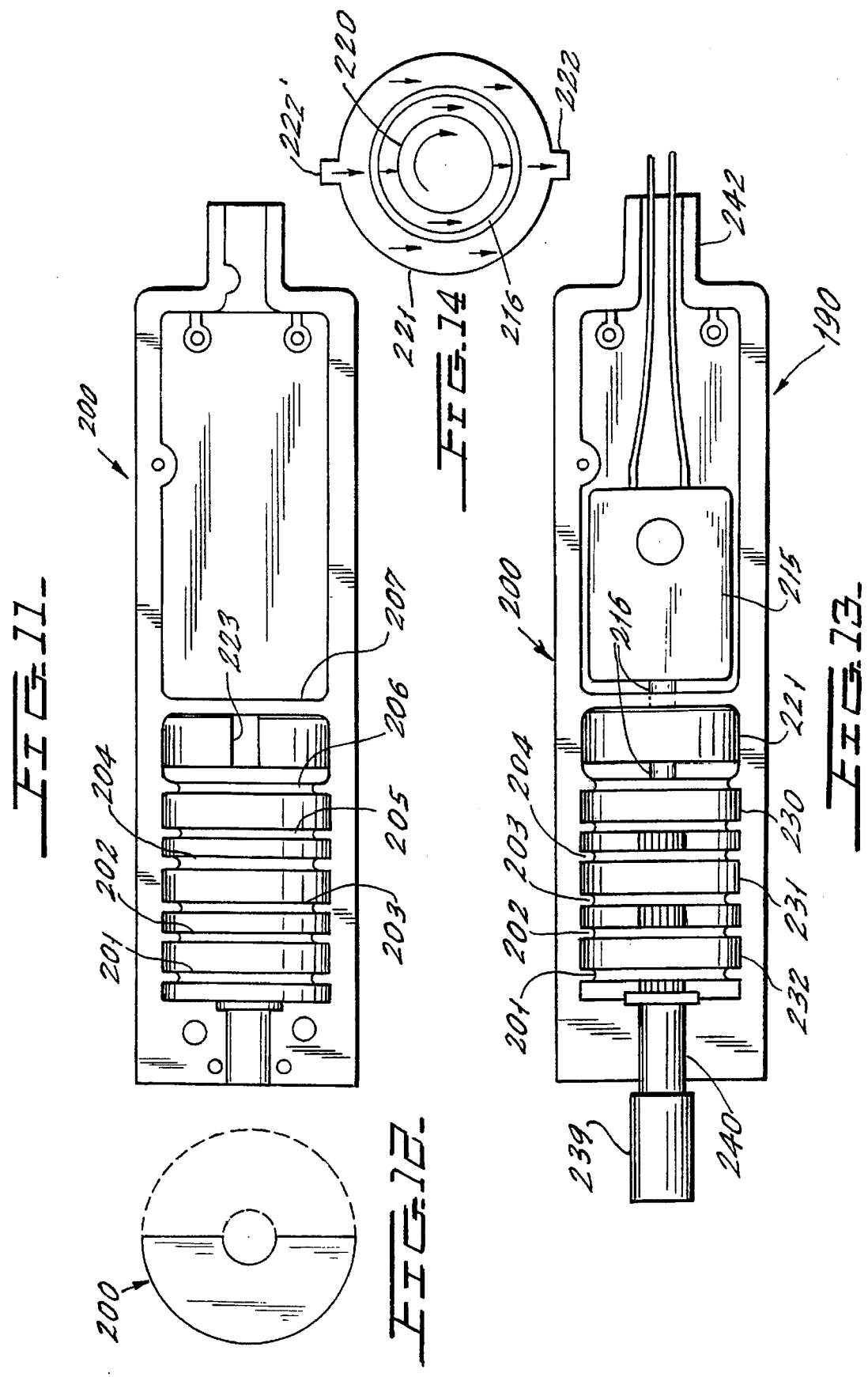

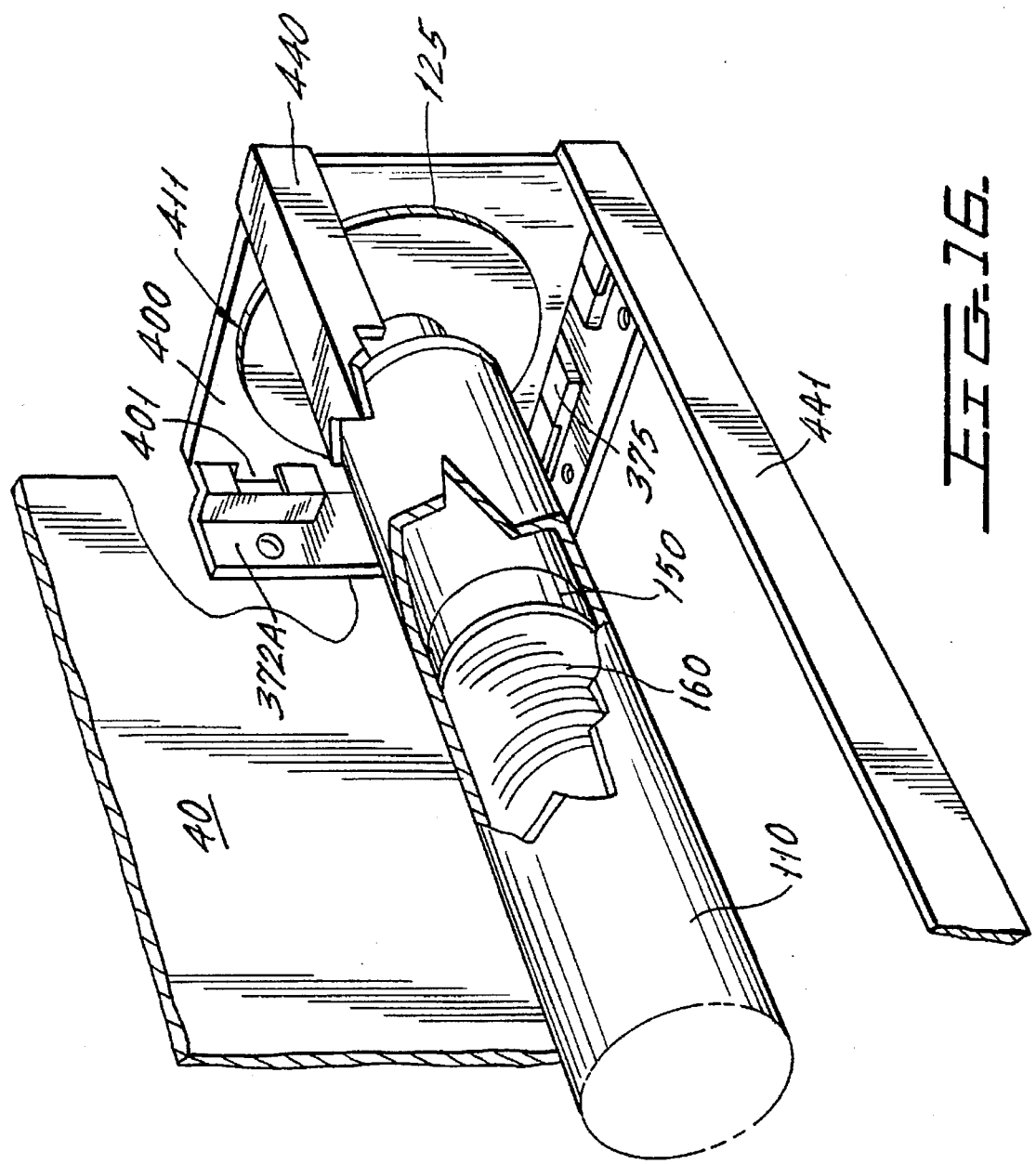

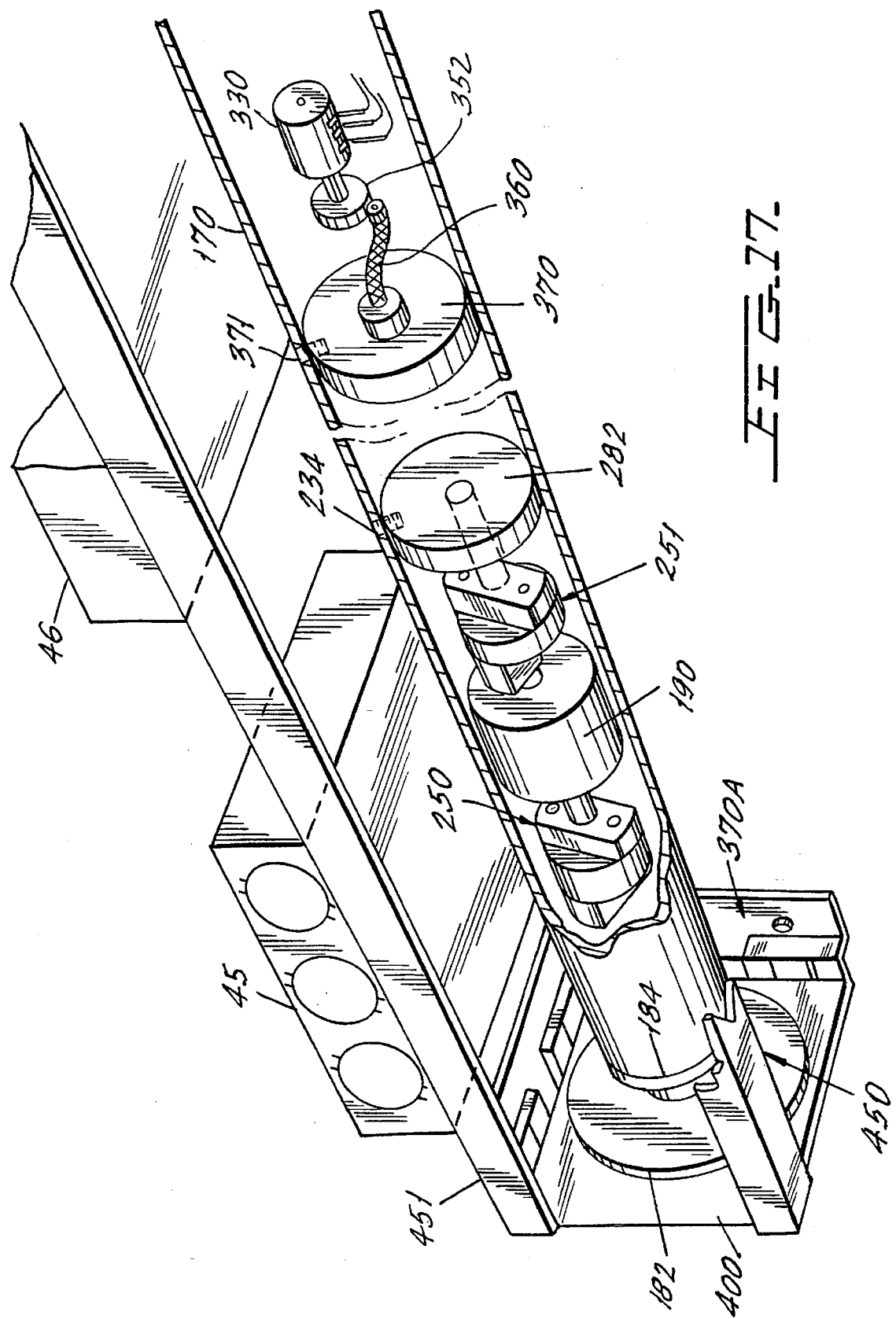

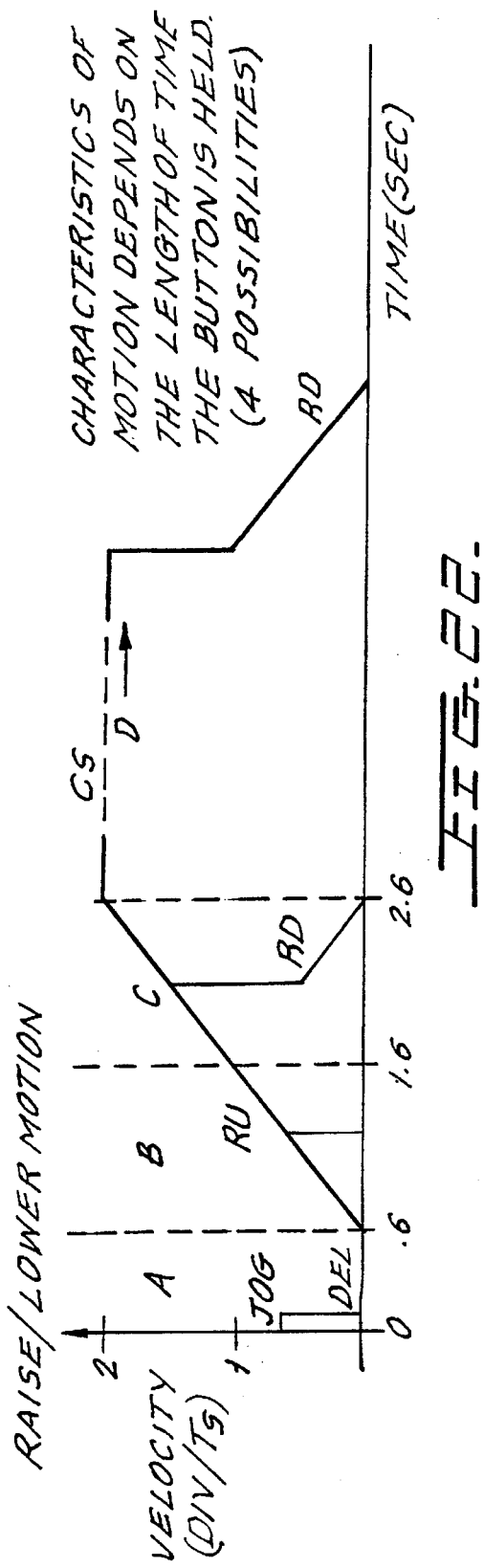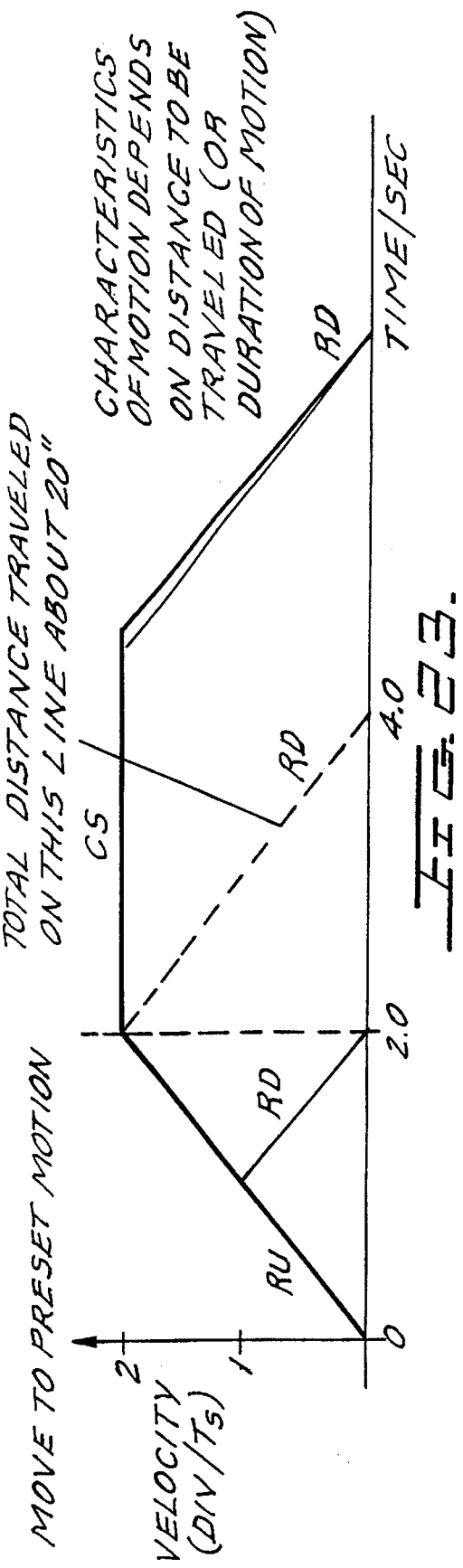

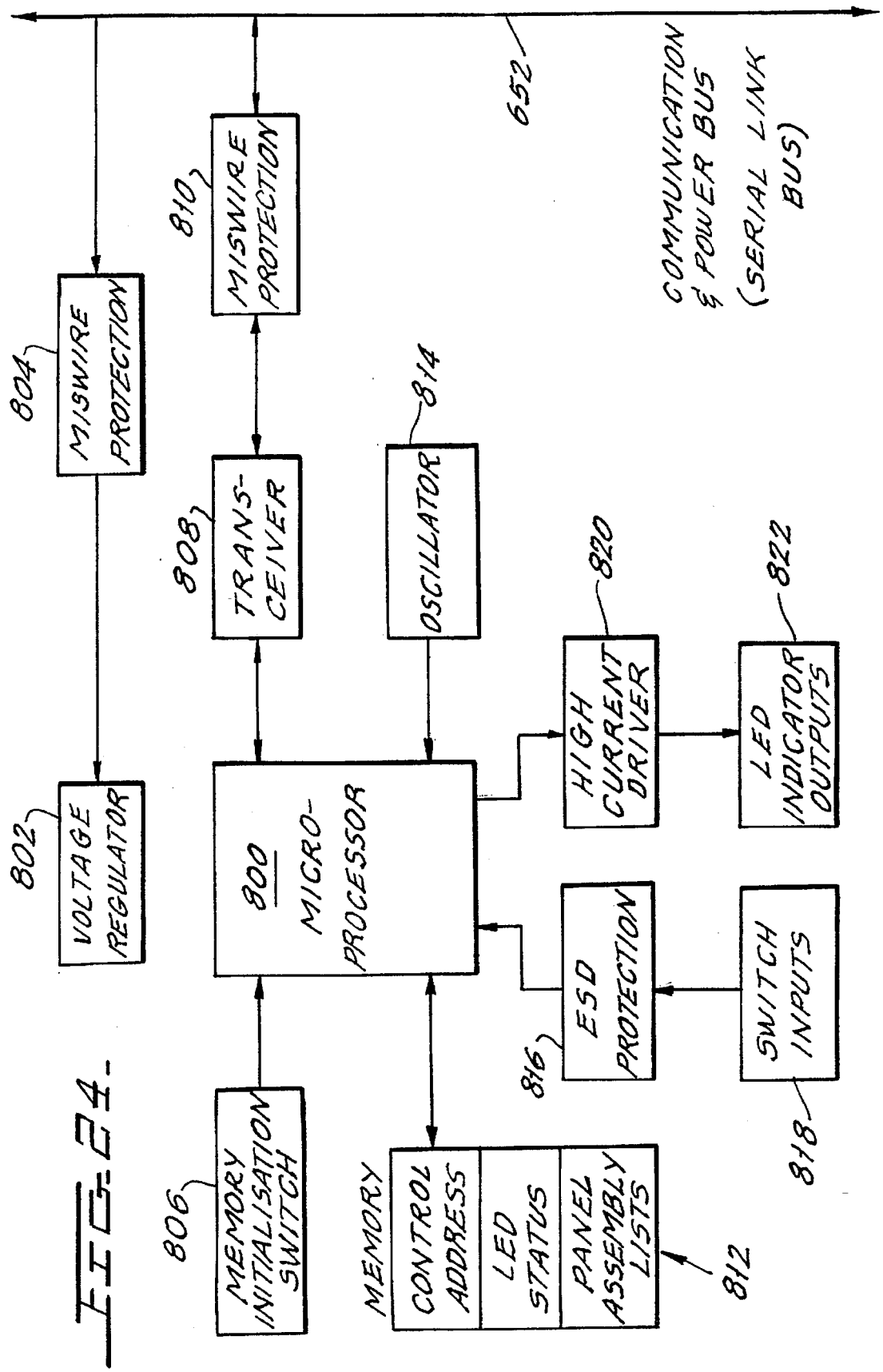

METHOD OF AUTOMATICALLY ASSIGNING DEVICE ADDRESSES TO DEVICES COMMUNICATING OVER A COMMON DATA BUS

This is a division of application Ser. No. 07/753,811, filed Sep. 3, 1991 now U.S. Pat. No. 5,467,266

FIELD OF THE INVENTION

This invention relates to window shades or covers and more specifically relates to a motor-operated window shade consisting of an elongated flexible web formed of a plurality of different panels connected end-to-end for controlling the transmission of light, heat or air through a window and/or for producing different decorative scenes within a room.

BACKGROUND OF THE INVENTION

It is known to make a window covering from a plurality of diverse panels which can be moved selectively in front of a window to control the light level or temperature or air flow in the room. Such window coverings are disclosed in U.S. Pat. No. 3,186,473 in the name of D. E. Meyers et al.; U.S. Pat. No. 3,236,290 in the name of Lueder; U.S. Pat. No. 4,766,941 in the name of Sloop et al.; U.S. Pat. No. 4,813,198 in the name of Johnston et al.; and U.S. Pat. No. 4,815,515 in the name of Lee et al. Devices of this general type are also sold by Mecho Shade Corporation of Long Island City, N.Y. and Draper Shade & Screen Corp., Inc.

In U.S. Pat. No. 3,186,473, an electric motor mounted adjacent the lower roller causes a panel to wind from an upper roller onto an lower roller. The panels are rewound onto the upper roller by a mechanical crank on the upper roller. The exterior motor takes up space alongside the window and is in a position at which persons near the lower roller are exposed to the motor wiring. Further, it is awkward to have to mechanically rewind the upper roller to move the panel upward.

In U.S. Pat. No. 3,236,290, a mechanical crank is connected to both upper and lower rollers and rotates them simultaneously. The crank my also be motor operated by a control adapted to move a light controlling and/or thermal controlling panel in position to maintain a constant light level (or thermal level) in a room. A torsion spring in the crank arm maintains a stretching force on the panel suspended between the rollers. The torsion spring is external of the rollers and the crank arm or motor are also external of the rollers and the wiring is at the windowsill level.

U.S. Pat. No. 4,766,941 employs electric motors and torsion springs in both upper and lower rollers, with the motors secured to the support bracket independently of the rollers. Thus noise reduction is impaired and wiring is located at windowsill level.

U.S. Pat. No. 4,813,198 employs an elongated panel between an upper and lower roller. The upper roller has a short helical return spring adjacent its end and a mechanical crank or motor for rotating the lower roller. Again, all parts are external of the rollers, the wiring for a motor is at the lower roller, and the shade is hard to install.

U.S. Pat. No. 4,815,515 shows a motor-driven upper roller with the motor disposed external of and adjacent to the upper roller, and a spiral spring (with coils wound atop one another) mounted adjacent to and externally of the lower roller.

The system sold by Mecho Shade Co. employs a freely suspended shade with a motor driven gear drive which is secured to an end bracket which is exterior to and mounted independently of the hollow roller tube. End stops are employed to stop the motor rotation between two end positions.

Systems sold by Draper include an overhead unit in which the cover is in a horizontal plane with a relatively short panel and a freely vertically suspended panel with a drive motor fixed to an exterior bracket.

BRIEF DESCRIPTION OF THE INVENTION

In accordance with the present invention, a novel system is provided for movement and control of a panel assembly which contains a series of panels which can be arranged in any desired sequence and which can be wound onto upper and lower rollers. The panel assembly may be used as a window covering. In operation, movement of the panel assembly can be stopped with part of one panel and part of a different panel in front of the window, or alternatively the panel assembly can be stopped with a full panel in front of the window to provide light, heat and air flow control, or to present designs or surfaces of any desired type. Two or more panel assemblies can be mounted side-by-side and can be controlled individually or together from a single controller. A panel position location transducer produces a panel location signal to a control circuit. The control circuit employing the position location transducer also includes one or more presetable switches which can be pressed to cause any desired panel to be exposed between the upper and lower rollers, or alternatively selected portions of adjacent panels to be exposed between the upper and lower rollers.

The panel is wound on substantially identical elongated hollow tubes which are mounted in identical rotatable supporting end caps. The upper tube assembly which forms the upper roller (when mounted on a vertical wall) contains a reversible motor, gear train, magnetic brake and position sensor totally within the interior of the upper hollow tube and vibrationally insulated from the support end caps, thus reducing noise during operation.

The motor, gear train and brake are all mounted within a separate elongated cylindrical insulation housing which is coaxially disposed within the upper tube. The motor stator is fixed against rotation by being coupled to the subassembly housing, i.e., to stationary end supports. The gear train input is connected to the motor through the magnetic brake. The gear train output is connected to the interior of the upper hollow tube. Couplers which contain vibration and noise suppressing rubber disks are fixed to the opposite ends of the cylindrical insulation housing. The couplers damp vibration and noise from the motor and gear train, prevent vibration from reaching the stationary end supports for the rotating hollow elongated tube, and enable reliable and smooth rotation of the hollow tube even if the rotational axis of the motor should be misaligned with the end supports and/or the tube axis.

The position sensor is also fixed within the upper hollow elongated tube. The sensor comprises a flexible cable coupled to, and rotated with, the hollow elongated roller. The cable is connected, through a gear reduction train, to a multiturn potentiometer, or other sensor. The value of the resistance at the potentiometer wiper or the portion of the total resistance tapped off by the potentiometer wiper is proportionately related to the number of rotations of the upper tube, and thus to the exact absolute position of the panel between the rollers (discounting minor errors due to mechanical consideration such as panel thickness, wraptightness and the like). Since the drive motor is contained within the upper roller, it is isolated from incidental contact with users. The power supply which operates from the AC line and produces a low voltage output is preferably also mounted at the top roller safely out of reach of users. Low voltage wiring my be used to energize the motor from the power supply through the controller. A wall-mounted control station connected to the controller with low voltage wiring or a wireless remote control station send signals to the controller.

The lower roller of the novel system employs a rotatable tube and rotatable end support caps identical to those of the upper roller. An elongated spring preferably about 15 inches long is contained fully within the rotatable tube of the lower roller and is supported by a central support rod or mandrel about which it is loosely wound. One end of the spring is fixed against rotation, and the other end of the spring is fixed to the hollow rotatable tube. The central support rod is free to rotate with the spring at the point of greatest friction. The spring is prewound, for example, by about 100 turns, to provide a biasing force which tends to exert a tensioning force on the upper roller through the panel extending between the upper and lower rollers. This force, and the weight of the suspended web, are resisted by the braking force of the magnetic brake, acting through the motor gear train, in the upper roller assembly. The reversible motor is, however, sufficient to provide the force needed to overcome the brake when the panel is raised or lowered. Once rotating, the magnetic brake presents almost no load to the motor.

The spring, which is prewound to about 90–100 turns with all the panels wound on the upper roller to produce a typical pulling torque of about five inch pounds, will have about 50–60 turns left when the panel assembly has been wound from the upper roller to the lower roller (except for the one last panel left extending between the two rollers), providing a typical minimum pulling torque of about three inch pounds. The magnetic brake torque is selected to be large enough to resist the maximum spring torque produced by the 100 turns, operating with the maximum radius of the top roller and wound up panels. It is also able to resist the torque provided by the spring together with the weight of a panel disposed between the two rollers.

The novel system of this invention permits the use of similar parts for the manufacture of the upper and lower rollers, providing economy of manufacture. Since all key parts of the system are contained within the rollers, installation of the system is considerably simplified. The novel use of flexible couplers within the hollow tubes substantially reduces noise and vibration. The electrical control also employs a ramping technique for gradually applying and removing power from the reversible motor thus further reducing noise and insuring smooth operation.

Following the installation of the rollers, appropriate trim can be used to enclose the rollers to act as a dust shield and decorative enclosure.

BRIEF DESCRIPTION OF THE DRAWINGS

FIG. 5 is an end view of the lower roller assembly of the system of the invention.

FIG. 6, is a cross-sectional view of FIG. 5 taken across section line 6—6 in FIG. 5.

FIG. 6a is an end view of cap 163 of FIG. 6.

FIG. 7 is a cross-sectional view of the upper roller assembly of the system of the invention.

FIG. 8 is a perspective view of the sensor assembly of FIG. 7.

FIG. 9 is a perspective view of one noise damping coupler of FIG. 7.

FIG. 10 is an end view of the coupler of FIG. 9.

FIG. 11 is a plan view of the interior of one-half of the motor subassembly housing of FIG. 7.

FIG. 12 is an end view of FIG. 11.

FIG. 13 is a view of FIG. 11 after the loading of the motor, magnetic brake, and gear train in the open housing.

FIG. 14 is an end view of the permanent magnets forming the magnetic brake in FIG. 13.

FIG. 16 is a perspective view of one end of the lower roller assembly.

FIG. 17 is a perspective view of one end of the upper roller assembly.

FIG. 20 is a functional block diagram of the motion control system operated under the influence of the single panel assembly or multiple panel assembly controls of FIGS. 18, 18a, 19 or 19a.

FIG. 22 is a preferred motion profile showing the movement of one or more shades in the raise/lower manual control mode.

FIG. 23 is a preferred motion profile showing the movement of one or more shades in the preset control mode.

FIG. 24 is a functional block diagram of a control panel of the present invention.

DETAILED DESCRIPTION OF THE DRAWINGS

Figure 1:
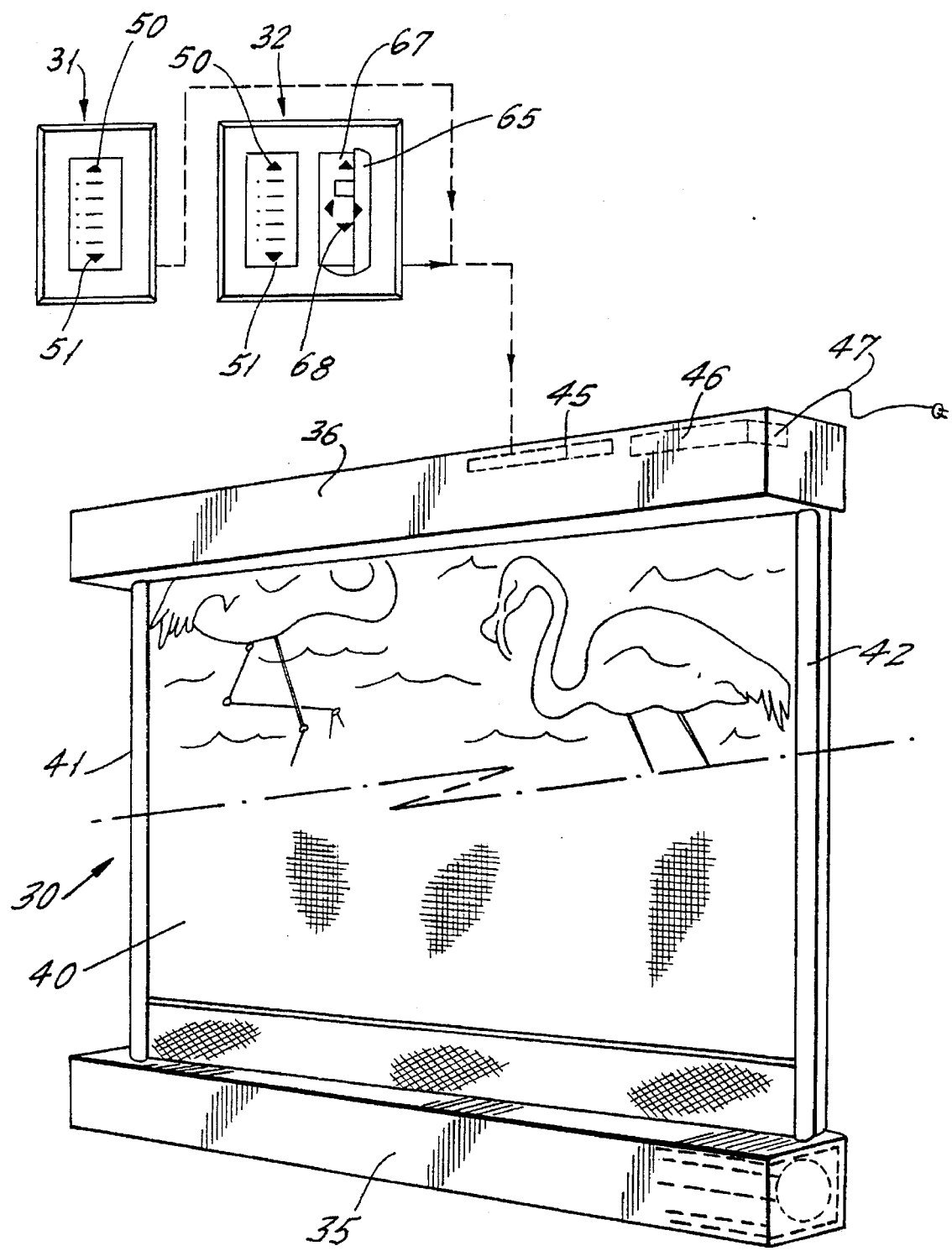
FIG. 1 shows an assembly of the system of the invention.

Referring first to FIG. 1, the assembly 30 of the present invention is shown in perspective view. Assembly 30 can be mounted adjacent to a window opening or to a flat vertical wall or, in general, to any building or other structure. The assembly can also be disposed in a horizontal plane, for example underneath an overhead skylight. It can also be disposed at an angle to the horizontal or vertical. A single assembly is shown, but a multiple of assemblies 30 can be mounted side-by-side, for example over a corresponding group of adjacent windows.

Two remotely located control panels 31 and 32 are shown, which can be wall mounted. A remote wireless control can also be employed. Control 31 is a single panel assembly control, shown in greater detail in FIG. 18. Another single panel assembly control 631 is shown in FIG. 18a. Control 32 is a multiple panel assembly control, shown in greater detail in FIG. 19. Another multiple panel assembly control 630 is shown in FIG. 19a.

Figure 2:
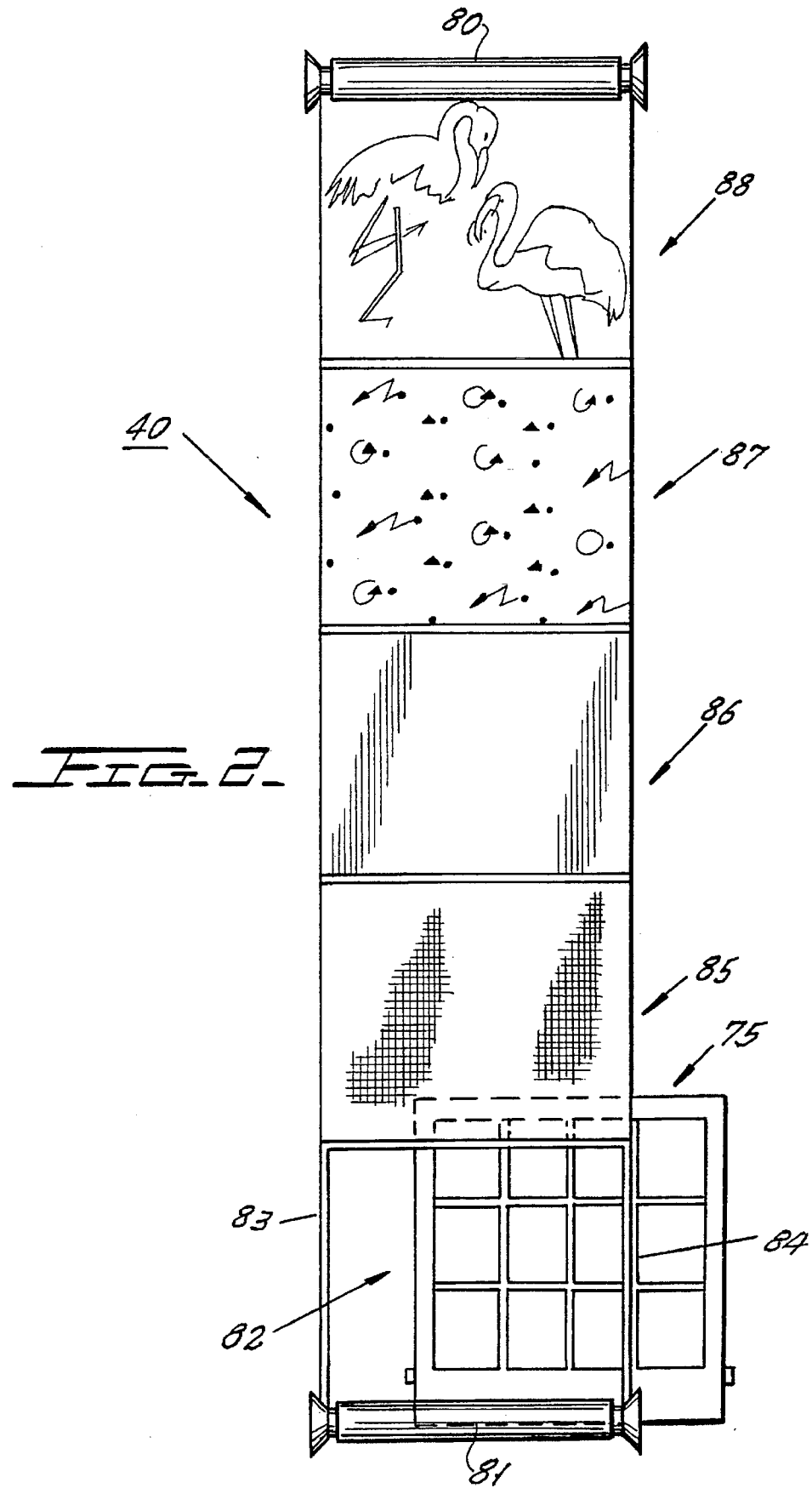
FIG. 2 shows a panel assembly which can be wound between the upper and lower rollers of the system.

The single assembly 30 includes a lower roller assembly contained within a decorative rectangular roller housing 35. An elongated panel assembly 40, consisting of five diverse panels connected end to end is schematically shown in FIG. 2. The side edges of panel assembly 40 are guided in side channels 41 and 42.

As will be later described, a drive motor within the upper roller assembly moves the panel assembly 40 upward or downward, under the influence of control 31. Control 31 is connected to motor controller circuit 45 via a class 2 control cable such as ribbon cable or telephone type cable. The power supply circuit 46 is connected to a power outlet, for example, a 120 volt a-c wall receptacle via power cord 47. This combination of easy to install low voltage control wiring and plug-power wiring allows for installation by the typical user without the necessity of using an electrical contractor. Alternatively power supply circuit 46 could be hardwired to the building distribution panel. Note that the controller 45 and power supply 46 are safely removed from areas which are ordinarily approached by users of the equipment or occupants of the room containing assembly 30.

To operate the assembly 30, the user raises or lowers the panel assembly 40 by depressing push buttons 50 and 51 respectively on controller 31. These buttons are held until the panel assembly is in the desired position, and are then released.

The controller also makes it possible to preselect a particular panel. Thus, where the panel assembly 40 consists of an open frame, a light blocking frame, a tinted translucent frame, a cloth texture frame and the image of flamingos, a respective one of the preset buttons 52, 53, 54, 55 or 56 (FIG. 18) is simply momentarily pressed and released and the controller circuit automatically runs the operating motor until the selected panel comes into place. One indicator light of lights 57, 58, 59, 60 and 61 adjacent push buttons 52 through 56 respectively will flash, corresponding to the preset button which was selected and continue to flash until the selected frame is in place. Alternatively, the preset buttons can be programmed to select selected portions of adjacent panels.

A control circuit for this purpose and related panel assembly motion profiles, shown in FIGS. 20-23, are described later herein.

Figure 18:
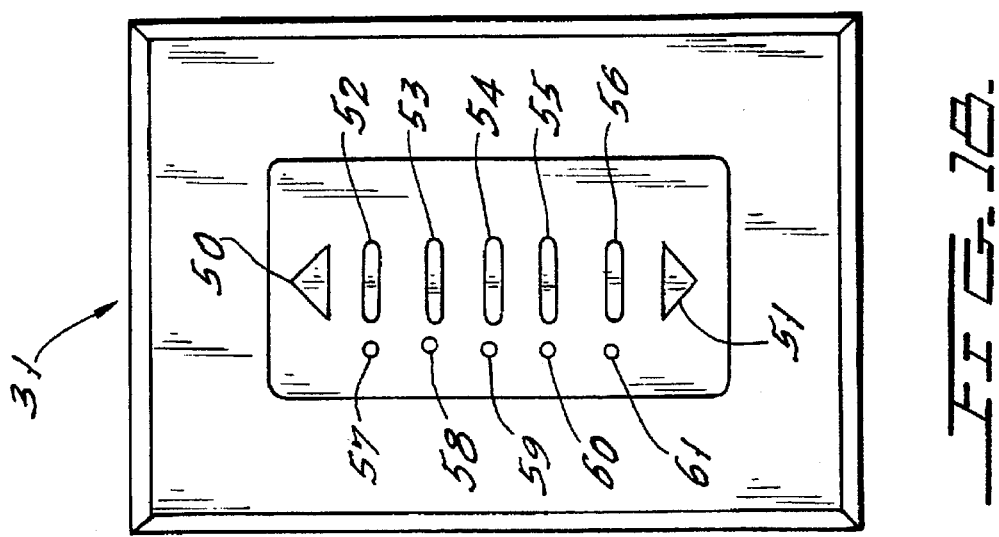
FIG. 18 shows the front of the control panel for a single panel assembly control.
Figure 18A:
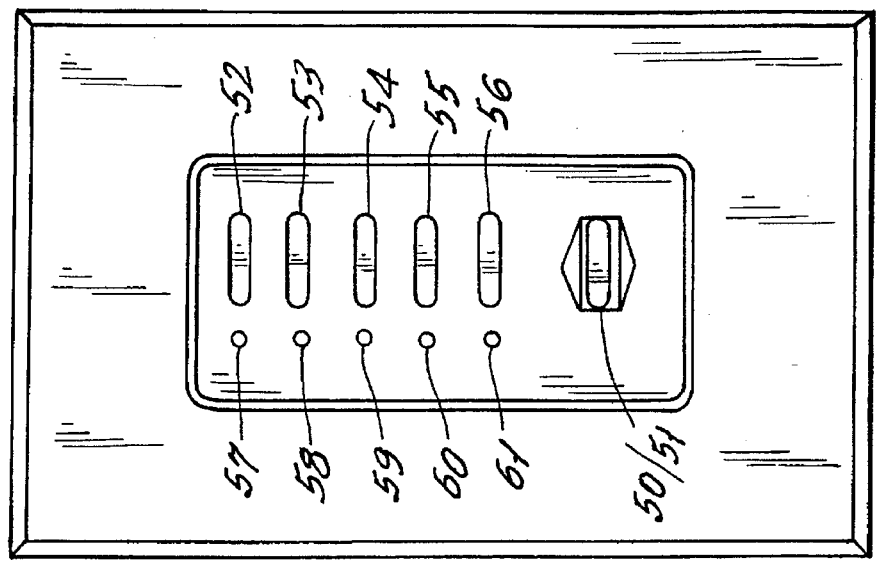
FIG. 18a shows the front of a control panel for another embodiment, of a single panel assembly control.

FIG. 18a illustrates a variation of the single panel assembly control 31 of FIG. 18. Control 631 of FIG. 18a is substantially similar to control 31 of FIG. 18 and comprises pushbutton switches 52 through 56 and indicator lights 57 through 61. However, individual pushbutton switches 50 and 51 of control 31 are replaced by toggle switch actuator 50/51 in control 631. Moving switch actuator 50/51 up closes internal switch contacts (not shown) corresponding to switch 50 of control 31 and moving switch actuator 50/51 down closes internal switch contacts (not shown) corresponding to switch 51 of control 31.

Figure 19:
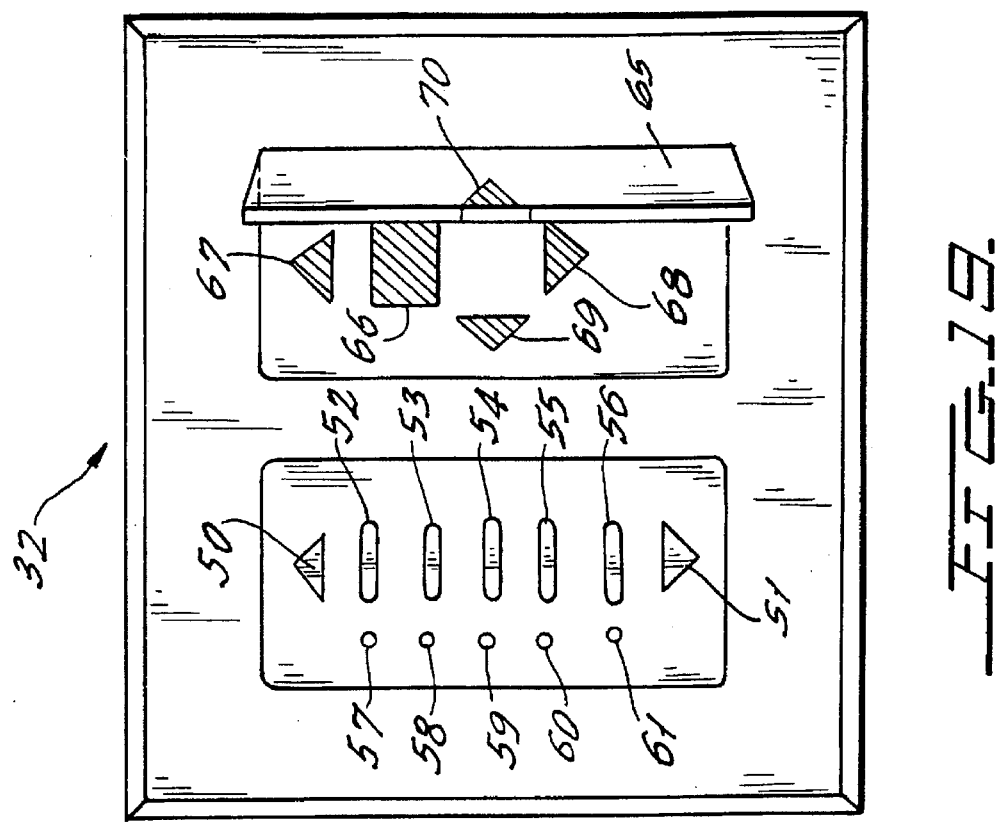
FIG. 19 shows the front of the control panel for control of multiple panel assemblies.
Figure 19A:
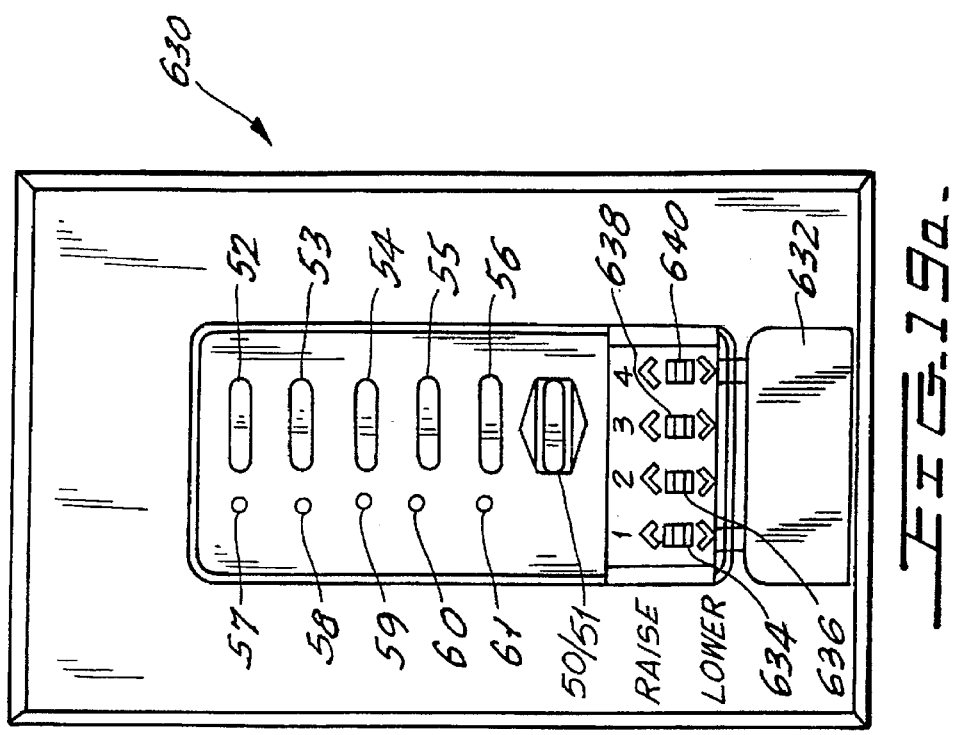
FIG. 19a shows the front of the control panel for another embodiment which allows control of multiple panel assemblies.

The multiple panel assembly control of FIGS. 1, 19 and 19a has a similar array of control buttons 50 through 56 and indicator lights 57 through 61. When these buttons are depressed, each of the multiplicity of panel assemblies 40 are simultaneously raised or lowered by the manual select buttons 50 or 51 or the preselect buttons 52 through 56.

If it is desired to operate only one of a number of panel assemblies, the control door 65 (FIG. 19) is opened to expose a display 66, individual raise and lower buttons 67 and 68, and assembly select buttons 69 and 70. This opening of the door disables the simultaneous control of all shades. To select a particular one of, say six panel assemblies, buttons 69 and 70 are pressed to reduce or increase the number displayed in display 66 until the desired assembly number is displayed. Thereafter, the panel of that assembly only can be raised or lowered by pressing either button 67 or 68 respectively, or by pressing one of the preset buttons 52 to 56.

Once door 65 is reclosed, the control is reset so that all assemblies are simultaneously operated by push buttons 50 to 56.

FIG. 19a illustrates a variation of the multiple panel assembly control 32 of FIG. 19. This multiple panel assembly control 630 is preferably configured to fit in a single gang electrical box and like the controller 32 comprises preset pushbuttons 52 through 56 and indicators 57 through 61. As in the single panel assembly control of FIG. 18a, individual pushbutton switches 50 and 51 of control 32 are replaced by a toggle switch actuator 50/51 in control 630 which actuates internal switch contacts. Operation of the actuators causes all the panel assemblies in a multiple panel assembly system to travel together up and down through actuations of the actuator 50/51 or a particular panel to be deployed when one of the preset pushbuttons 52 to 56 is momentarily depressed.

To control individual panel assemblies independently of one another, a door 632 is opened to expose individual raise/lower switches 634–640 each of which comprises a toggle switch by which the first, second, third and fourth panel assembly of a four panel assembly system can be individually raised/lowered by operating the toggle switches 634–640.

FIG. 2 shows the panel assembly 40 of FIG. 1 fully extended to show all of the five panels. A window 75 is also shown to show the scale of the panels. Although the preferred embodiment of the invention has five panels and associated presets, it is possible to have any number of panels and associated presets desired. The top of panel assembly 40 is connected to an upper roller 80 which is within the upper roller assembly 36 of FIG. 1 and its bottom is connected to the lower roller 81 which is within lower roller assembly 35.

Panel 82 is an open panel having 100% light transmission. It may consist simply of two edge tapes 83 and 84 secured to roller 81 and the bottom of the next panel 85. Panel 85 may be a blackout panel with 0% light transmission. It may be plain white, or colored, or laminated with a picture or design. Panel 85 can have a height and a width adapted to cover the height and width of window 75.

The third panel 86 can be a tinted panel which can have, for example, 20% light transmission. It can also carry a design if desired. The fourth panel 87 may be a repeating design fabric and can, for example, have about 50% light transmission. Finally, the fifth panel 88 may be a picture or fabric, also with 50% light transmission.

Figures 3, 3A, 3B, 3C:
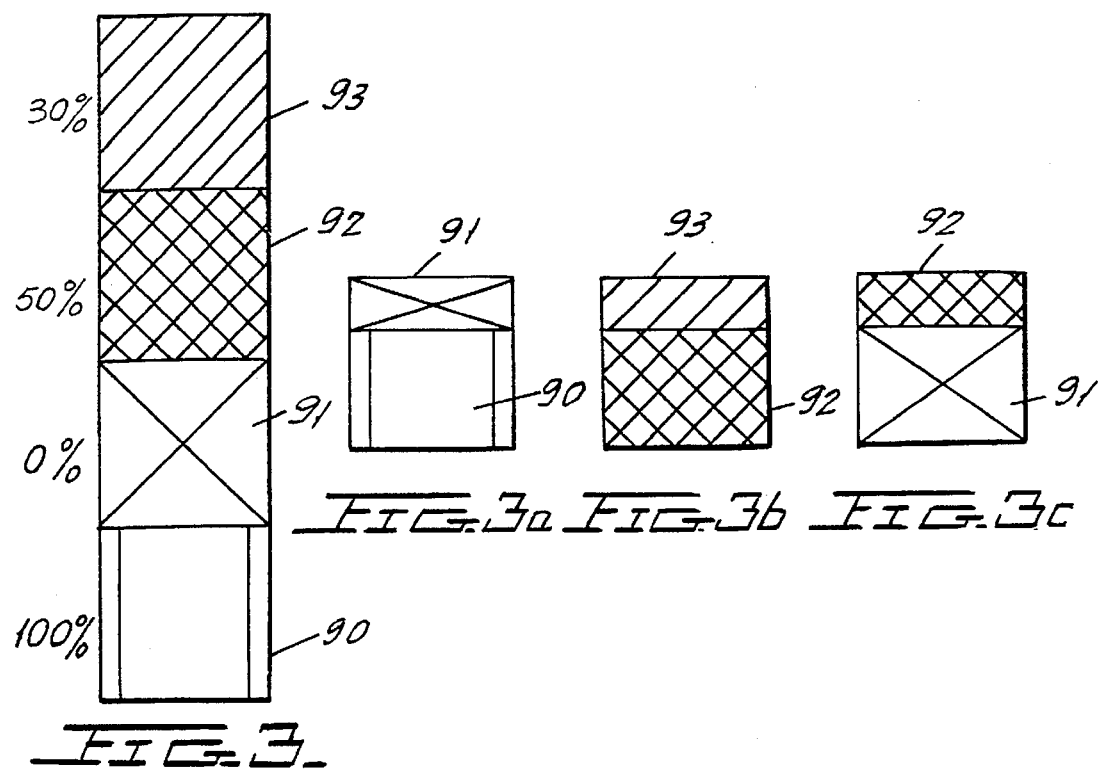
FIG. 3 schematically illustrates another panel assembly which can be Used with this invention.
FIGS. 3a, 3b and 3c show particular panel assembly positions which can be assumed for the panel assembly of FIG. 3.

There are numerous clerestory options available, some of which produce unobvious advantages. Thus, a unique panel sequence is shown in FIG. 3 of four panels 90, 91, 92 and 93 which have light transmission capabilities of about 100%, 0%, 50% and 30%. The control circuit can be operated to dispose any one of panels 90 to 93 in front of the covered window. However, the panel assembly can be stopped in intermediate positions as shown in FIGS. 3a, 3b and 3c, producing different clerestory effects, enabling selected degrees of light transmission with selected conditions of viewing through the primary portions of the window. For example, in FIG. 3a there is an unobstructed view through the lower portion of the window and blocking of light at the top. In FIG. 3b there is an obscured primary view while more light comes through the top of the window. In FIG. 3c, the primary view is blocked and some light is admitted through the top of the window.

Figures 4, 4A, 4B, 4C:
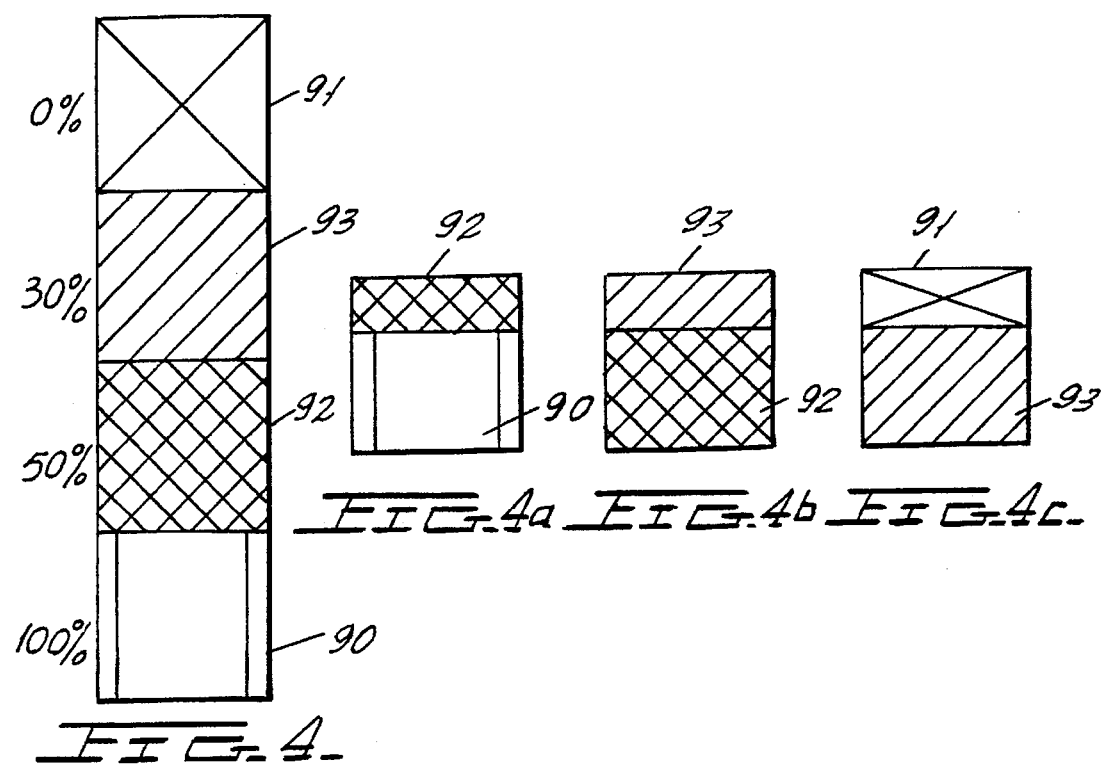
FIG. 4 shows a panel assembly with a sequence of frames different from that of FIG. 3.
FIGS. 4a, 4b and 4c show particular panel assembly positions which can be assumed for the panel assembly of FIG. 4.

In a further embodiment of FIG. 4, the panels 90 to 93 have been rearranged in a sequence of continuing increase in light transmission from top to bottom, producing the clerestory options shown in FIGS. 4a, 4b and 4c.

The arrangement of panels can take any desired form. The panels can for example be selected from the following:

Polarized panels

Fresnel lens panels

Prismatic/refracting panels for directing light at desired angles

Metallized film panels

Fly screen panels

Panels containing various size vent holes or slots

UV (ultraviolet) light blocking panels

Picture projection screens

Various graphic displays on either side or both sides of the panel.

Hologram panels

Grass cloth

Wallpaper designs

Panels in the form of illuminated fake windows

Panels bearing a company logo

Replaceable panels connected to side bands by Velcro, etc.

A polarized panel is a panel consisting of a flexible film of polarizing material. The polarizing material allows only light whose polarization is in a particular direction to pass through it, thus reducing the intensity of the light and the glare associated with it.

A fresnel lens panel is a panel consisting of a flexible fresnel lens which focusses the light passing through the panel.

A prismatic/refracting panel is a panel which has flexible microprisms on it which are arranged to direct the light passing through them in a particular direction.

A hologram panel is a panel which contains a holographic image such as a reflective white light holographic image.

A panel in the form of an illuminated fake window may have a design on it of a view through a window and is designed to be used against a wall with the side of the panel closest to the wall being illuminated.

The above list is not exhaustive, and any light control, visual pattern, air control and/or thermal control surface can be employed.

The panels need not all be of the same length and each panel can be longer or shorter than the distance between the rollers 80 and 81.

The structure of the lower roller assembly 81 for the novel system of the invention is best shown in FIGS. 5, 6 and 6a.

A hollow elongated plastic tube 110 is the main rotatable lower support for the panel assembly of the system. The lower end of the panel assembly may be connected to the outer surface of tube 110 by tape, or, if desired, a clamping arrangement of any selected type can be used. Tube 110 may be of any desired material, and in the preferred embodiment of the invention, it is a plastic, for example PVC having an outer diameter of about two and three eighths inches and a wall thickness of about 0.15 of an inch.

A pair of identical end supports 111 and 112 are arranged to rotatably support the ends of tube 110. Each end support 111 and 112 has a fixed body member 113 and 114, respectively, adapted to be secured to below described wall mounted brackets. Rotatable end caps 117 and 118, with built in bearings fixed to rotate with the tube 110, form end caps for tube 110. Fixed members 113 and 114 contain end brackets 119 and 120 respectively which are adapted to slide into a wall mounted bracket to be later described with FIG. 15 for mounting the lower roller assembly.

Rotatable end caps 117 and 118 have large diameter flanges 125 and 126 which have tapered facing side surfaces 127 and 128 respectively which act to guide the winding of a panel onto the tube 110 with the edges of the panel precisely overlapped and aligned. Small flanges 130 and 131 are created where rotatable end caps 117 and 118 respectively connect to tube 110. The large and small flanges 125, 126, 130 and 131 define annular wells 125' and 126' in which the edge tapes 83 and 84 are wound so that the panels 85–88 may be evenly wound flat on the tube 110.

The tube 110 is fixed to rotatable caps 117 and 118 by any securing means, for example, by set screws such as set screw 135. The heads of all set screws are set below the surface of tube 110 so as not to press against the panel wound on tube 110.

A control spring support tube 140 which is also plastic is contained within the interior of tube 110. Tube 140 has a diameter of about 1.3 inches, a wall thickness of about 0.125 of an inch and a length of about 19 inches.

Roller coupler 150 is disposed within tube 110 and secured to rotate therewith by set screw 151. An integral extending tubular section 152 of roller coupler 150 carries a bearing 153. The left hand end of tube 140 is then rotatably supported relative to roller coupler 150 by the bearing 153.

A helical elongated spring 160 which, in its fully wound condition still freely clears the outer diameter of spring support tube 140, is disposed around the surface of tube 140 and is coextensive therewith. In the preferred embodiment of the invention, the spring 160 is formed of spiraled wire having a rectangular cross-section the length dimension of which extends radially, and having, in its unwound condition, about 500 turns. Square or even round wire may also be used.

The left-hand end of spring 160 is secured to cap 163 by being captured in a groove 163A in the end of cap 163 as is illustrated in FIG. 6a. Cap 163 is fastened to roller coupler 150 by rivets or bolts 150A, which traps the end of spring 160 in groove 163A thus securely fastening spring 160 to cap 163.

The right-band end of spring 160 is secured to cap 161 in a similar manner, with cap 161 being fastened to adaptor 161A by rivets 150B and hence capturing the right-hand end of spring 160.

Adaptor 161A is coupled to fixed body member 114 and rotatably supports the right-hand end of tube 140 through cap 161 and bearing 153A.

During the installation of the lower roller assembly, the roller 110 is prewound, in the same direction as the spring 160 is wound, for about 90–100 turns with the panel assembly 40 wound on the upper roller 80. The working range of the spring is preferably between about 60 to 100 turns. The spring 160 has at least about 50 turns left after the panel assembly 40 is wound on the lower roller 110 in order to exert a sufficient minimum pulling torque of about 3 inch pounds on the upper roller assembly 80.

The upper roller assembly 80 is shown in cross section in FIG. 7, which figure is broken into two sections for convenience of illustration. The upper roller assembly employs a rotatable tube 170 which is preferably identical to lower roller tube 110 of FIG. 6, and is mounted by end supports 171 and 172 which my be identical to or similar to end supports 111 and 112 respectively of FIG. 6. Thus, end supports 171 and 172 have stationary body members 173 and 174, respectively, which have end mounting brackets 175 and 176 respectively, and rotatable caps 179 and 180, respectively. Caps 179 and 180 have large diameter flanges 181 and 182 respectively and small diameter tube ends 183 and 184 respectively.

The interior of tube 170, as shown in FIG. 7, contains a reversible drive motor assembly 190 which drives the tube 170 in rotation about its axis, but is vibrationally isolated from stationary end supports 173 and 174. The reversible drive motor system is shown in more detail in FIGS. 11 to 14.

The drive motor system is mounted between identical molded shell halves, such as the molded shell 200 of FIGS. 11 and 12. FIG. 11 is a view looking into the hollow cavity of the shell. The shell contains interior circumferential locating ribs 201 to 207 for locating elements of the drive system. An identical shell, shown in dotted lines in FIG. 12, is bolted to shell 200 after the drive parts have been laid in place within shell 200.

The parts within shell 200 are shown in place in FIG. 13 and include a reversible motor 215, which may be a 24 volt d-c motor having an output shaft 216 rotating at 7500 rpm when energized by the controller. Shaft 216 is fixed to a permanent magnet disk 220 (FIG. 14) which is disposed within a fixed permanent magnet ring 221. Ring 221 is mounted between ribs 206 and 207 and has a position locating projections 222 and 222' (FIG. 14) which are located in slot 223 and its equivalent in the other half of shell 200 (FIG. 11).

Disk 220 and ring 221 are permanently magnetized in the directions shown in FIG. 14 and act as a magnetic brake on the motor 215 and tube 170. They may be formed of a powdered magnetic ceramic. The magnetic strength of the magnets is such that they can prevent rotation of shaft 216 under the influence of the torque of spring 160 of the lower roller assembly 81 and the weight of the panel assembly 40 suspended between the upper and lower rollers. Thus, panel assembly 40 is locked in position when motor 215 is deenergized.

The shaft 216 is then connected to a gear train which provides a 125 to 1 gear reduction ratio and which consists of three gear reduction stages 230, 231 and 232. The last gear reduction stage 232 has an output shaft 239 disposed within bushing 240. Hence, shaft 239 rotates at 60 rpm for a rotation of motor shaft 216 of 7500 rpm.

The right end of the motor drive housing 190 has a short tubular stub 242 while the motor driven shaft 239 extends from its left end. As shown in FIG. 7, stub 242 is connected to a vibration absorbing coupling 250 and shaft 239 is connected to an identical vibration absorbing coupling 251 (also shown in FIGS. 9 and 10).

Couplings 250 and 251 each comprise a pair of identical T-shaped members 255–256 and 253–254 respectively. Each of members 253 to 256 have axially extending tubular sections 257, 258, 259 and 260 respectively having cross pieces 261, 262, 263 and 264 respectively. The opposing surfaces of cross pieces 261 and 262 are arranged perpendicular to one another and are bolted or otherwise clamped to a thick (⅜ inch) rubber disk 270, that has been constructed of 40-Durometer Neoprene in an embodiment of the invention that was reduced to practice. Similarly the faces of cross pieces 63 and 264 are clamped to a rubber disk 271. Note that each cross piece is separately connected to its rubber disk independently of the other cross piece. Consequently, the coupling is flexible axially as well as around axes defined by the directions of elongation of the cross pieces 261 to 264. The couplings 250 and 251 thereby serve the dual purposes of providing excellent noise insulation for the motor assembly 190 and smooth driving of the roller tube 170 even if the axis of the motor assembly 190 should not be perfectly axially aligned with the tube 170, the end cap 174, or the roller coupler 282 (described below).

As shown in FIG. 7, rotatable shaft 239 is telescoped into tube 258 and is fixed thereto by set screw 280. Alternatively, shaft 239 can be attached to tube 258 by other means. The other end of coupler 251 is connected to extension 281 of roller coupling 282 which telescopes into tube 257. Roller coupler 282 is connected to tube 170 by set screw 284. Thus, the output shaft of the motor is connected through a magnetic brake, gear train and vibration-damping coupling to the tube 170.

Extension 242 of the motor housing is telescoped into coupler tube 259 and is fixed by set screw 290 or other fastener means. Similarly, the tube 260 of coupler 250 is telescoped over extension 291 of fixed body 174 and is fixed thereto by set screw 292. Accordingly, the motor housing 190 and thus the body or stator of motor 215 are fixed, through vibration damping coupling 250 to the fixed body member 174. Therefore, when motor 215 is energized, roller 170 is driven about its axis relative to the fixed members 173 and 174 with a motor drive that is contained totally within roller 170 and which is vibrationally insulated from the stationary roller supports for low noise operation.

Next shown in FIG. 7 is a position sensor 310 for monitoring the rotation of roller tube 170 and generating an output related to the angular rotation position (number of turns and partial turns) of roller tube 170 relative to a starting reference position. Such an output is also related to the position of the panel assembly 40 (FIG. 2) between the upper and lower rollers 80 and 81 and can be used in the control circuit for the preset buttons 57 to 61 of FIGS. 18, 18a, 19 and 19a, whereby the motor will continue to drive the upper roller until the position sensor indicates that the desired panel assembly position has been reached. A suitable ramp circuit can be initiated just prior to the panel assembly reaching its preselected position to allow the panel assembly to come smoothly to rest in its designated location.

Sensor 310 is mounted on a sheet metal frame 311 (FIGS. 7 and 8) which has downwardly bent legs 312, 313 and 314. A central projection 315 of stationary member 173 extends through an opening in legs 312 and a spring nut 320 snaps onto leg 312.

A multiturn (10 turns in the preferred embodiment) potentiometer 330 has a projecting threaded support 331 through which rotatable potentiometer shaft 332 extends. Spring nut 333 on support 331 clamps potentiometer 330 to frame leg 313.

The potentiometer 330 is adapted to produce a unique resistance value between two of its output terminals 340 and 341 for any rotational angle of shaft 332 over its full 10 turns. Alternatively a third terminal (not shown) can be used to enable potentiometer 330 to be used in the circuit of FIG. 21. Shaft 332 is driven by a 4 to 1 ratio gear drive consisting of gears 350 and 351. Gear 350 is fixed to shaft 332 and gear 351 is rotationally mounted on leg 314 of bracket 311. The shaft 352 of gear 351 is then connected to a flexible drive wire 360. Wire 360 is then connected to and is rotated by roller coupler 370 which is fixed to tube 170 by set screws 371 (FIG. 7).

Accordingly, when tube 170 rotates, it rotates wire 360 which, in turn rotates gear 351. Gear 351 then drives gear 350 and shaft 332 with a 1 to 4 reduction in rotation. Consequently, 40 rotations of roller 170 (its full rotation range in the preferred embodiment) rotates shaft 332 its full 10 turns. Thus, the resistance at terminals 340 and 341 is uniquely related to the location of the panel assembly 40 as it moves between the upper and lower roller tubes 170 and 110.

Although position sensor 310 is shown as a multiturn potentiometer in the preferred embodiment, there are many alternative methods which can be used to determine the position of the panel assembly. For example, the number of revolutions of the top roller could be counted. Alternatively, a mechanical, optical, magnetic or other type of sensor could be used to determine the position of the panel assembly by applying a mechanical, optical, magnetic or other type of marking to one edge of the panel assembly and sensing the position of the panel assembly directly.

Figure 15:
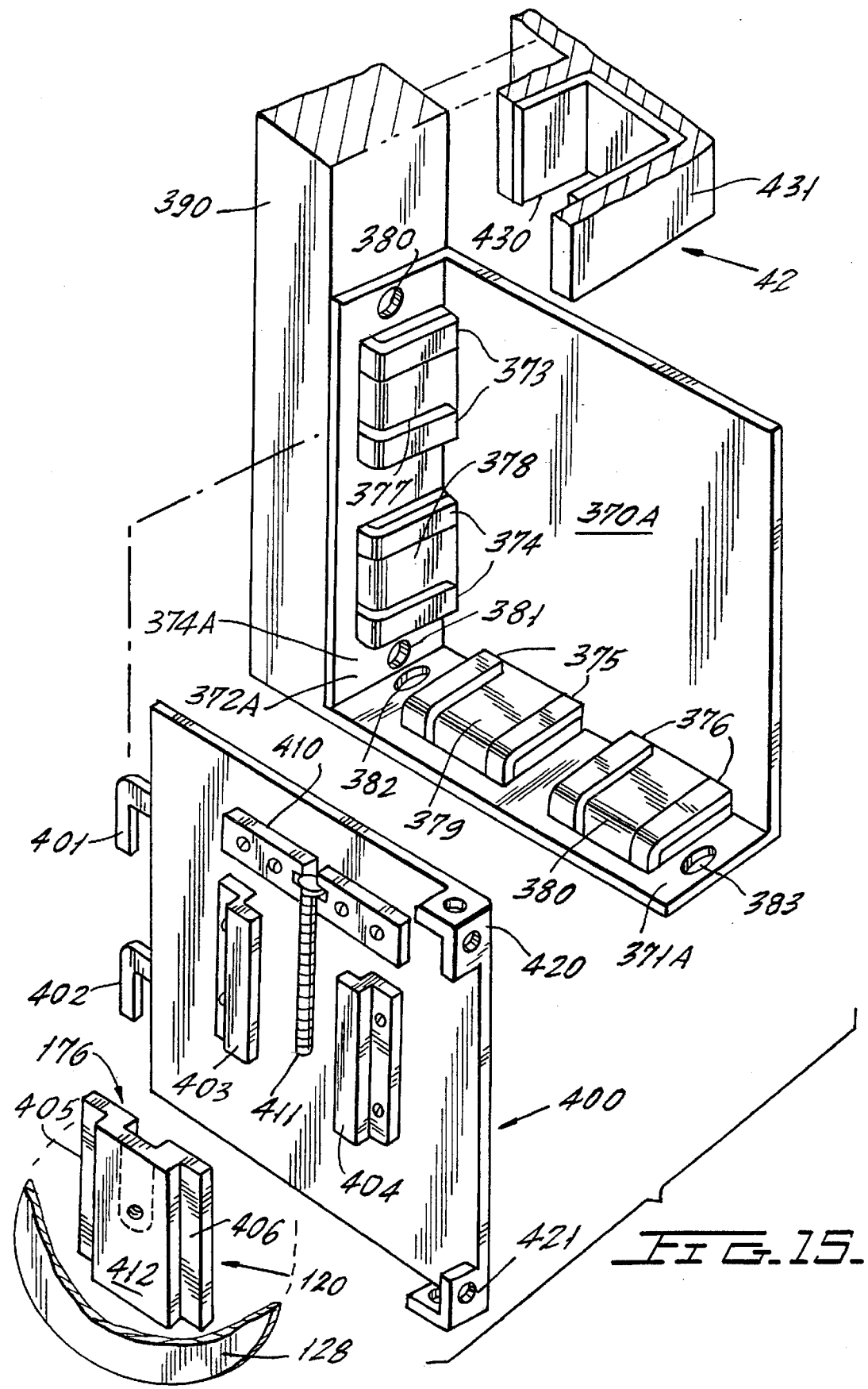
FIG. 15 is an exploded perspective view of the support bracket for supporting the lower roller and an adjustment means for adjusting the position of one end of the axis of the roller and a vertical guide for guiding the edge of the panel, web.

FIG. 15 shows a typical wall bracket for supporting the ends of the rollers of FIGS. 7 and 8, particularly the right hand end support 112 of FIG. 6. The bracket consists of a metal stamping 370A having short perpendicular extensions 371A and 372A which contain inwardly deformed sections 373 to 376 which have openings centrally located at 377 to 380 respectively. Mounting screw openings 380 to 383 are also provided to permit the mounting of the bracket to a window frame or other structure.

In the installation of a system of the invention, it may be useful to install wood strip 390 along both sides of the window frame, from top to bottom. The bracket 370A is mounted on this strip 390. A bracket substantially like bracket 370A is positioned to support each end of each of the upper and lower rollers 80 and 81.

An intermediate bracket 400 which may also be a metal stamping is provided with a pair of mounting projections 401 and 402 which are adapted to fit into slots 377 and 378 respectively. Bracket 400 has spaced offset members 403 and 404 fixed thereto to define first and second slots for receiving reduced thickness sides 405 and 406 of end support 120.

An upper member 410 fixed to bracket 400 captures the head of a rotatable screw 411. Screw 411 is threaded into a threaded opening 412 in the head of end support 120, thereby to fix end support 120 vertically relative to bracket 400.

A pair of front frame support projections 420 and 421 also extend from bracket 400 to receive front frame strips for enclosing the rollers after they are mounted.

In order to install the system, four brackets 370A are installed to receive each end of the upper and lower rollers. An intermediate frame 400 is then fixed to each end of each roller and is secured by the screw 411. The upper and lower rollers are then mounted by simply inserting hooks 401 and 402 into their respective slots 377 and 378 in bracket 370A. Lower roller 110 is prewound by 100 turns before mounting as previously stated.

The panel assembly 40 will have been secured to the upper and lower rollers and wound on the upper roller before its installation. It is preferably wound around the roller with the web adjacent to the surface or window to which the assembly is fixed.

Side channels 41 and 42 are cut to end at the brackets 370A, as shown in FIG. 15 for channel 42, and may be fixed to the wood strip, such as strip 390 in FIG. 15. As shown in FIG. 15, channel 42 has a short leg 430, and a long leg 431 which connected to wood strip 390 and covers the side edge of the panel which is disposed between legs 430 and 431 as shown in FIG. 1. A thin felt strip (not shown) may line the interior surface of channels 41 and 42.

FIG. 16 shows the lower roller assembly with all parts in place. The left and right ends of the roller have been reversed compared to FIG. 6, and in some cases, the parts have a slightly different form than in the preceding figures. Horizontal frame strips 440 and 441 are secured to intermediate bracket 400. The outer trim 35 (FIG. 1) for the lower roller assembly is secured to strips 440 and 441.

The lower tube 110 and its internal spring 160 and roller coupler 150 and flange 125 are appropriately mounted and the panel assembly 40 extends upwardly from behind the roller 110 in FIG. 16. The adjustment screw 411 (FIG. 15) can be adjusted to raise or lower one end of the axis of the tube 110 to make it parallel to the axis of the upper roller.

FIG. 17 shows the right hand end of the upper roller assembly. The left and right ends of the roller have been reversed compared to FIG. 7 and again some parts have a slightly different form than in the preceding figures. Again the brackets 400 and 370A support the upper tube 170. Strips 450 and 451 are secured to bracket 400 and will support the upper roller enclosure 36 of FIG. 1. The electrical controller 45 and power supply 46 are mounted out of easy reach and atop the upper roller assembly 80. Electrical conductors are taken into the interior of roller 170 from controller 45 and power supply 46 through openings in the end supports 171 and 172 as shown in FIG. 7.

The motor and gear train assembly 190 in FIG. 17 is then supported between noise reducing couplings 250 and 251. Finally, the roller coupler 370 mounted as shown in FIG. 7 rotates the flexible shaft 360 to rotate shaft 332 of sensor assembly 310 through a reduction gear train.

Figure 20:
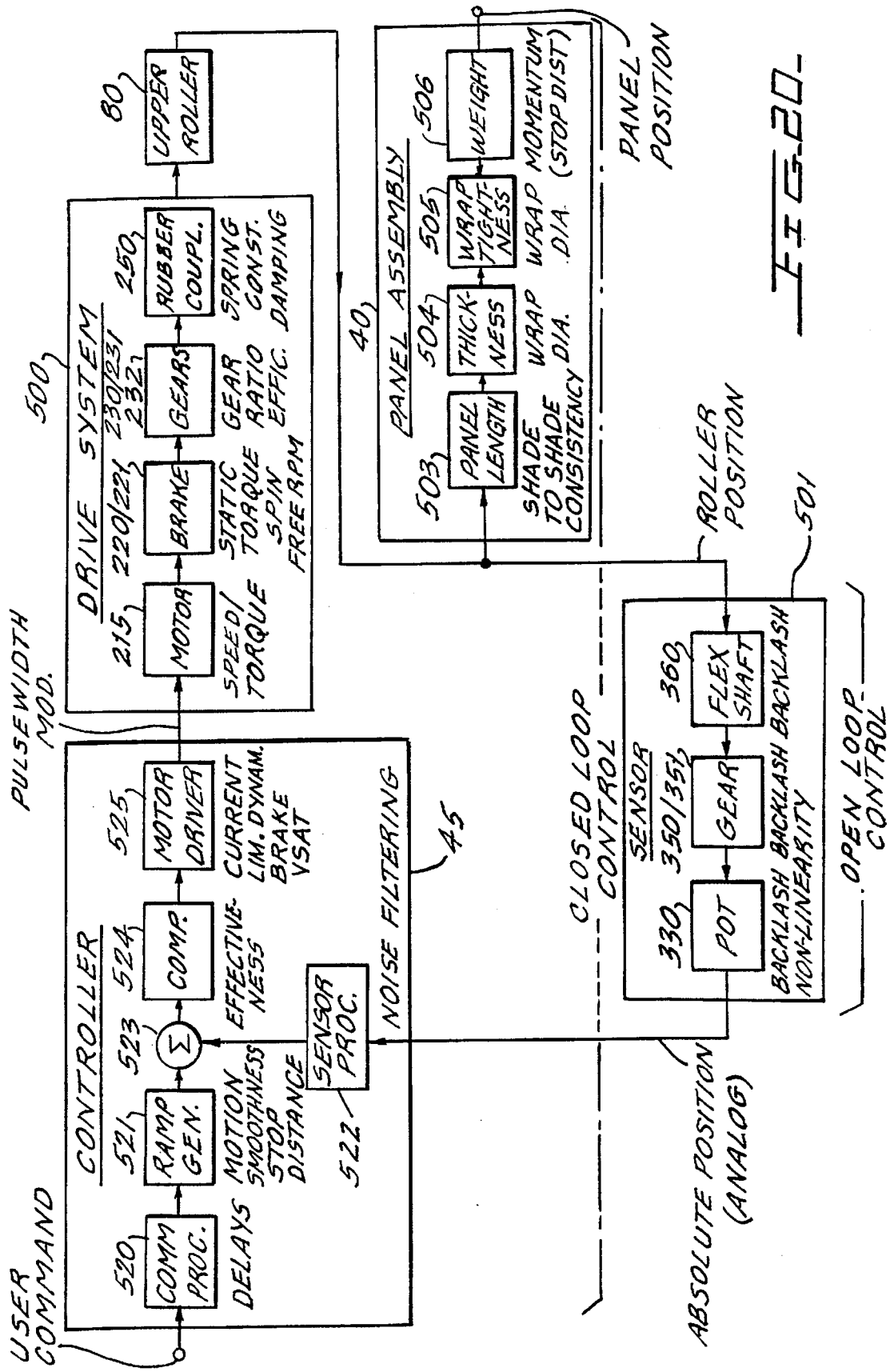

The overall motion control system of the invention is shown in FIG. 20 where the basic control blocks include the controller 45 (FIGS. 1 and 17), the drive system 500, the upper roller assembly 80, a panel assembly 40 and a position sensor assembly 501. The drive system 500 consists of motor 215, magnetic brake 220/221, gear train 230/231/232, and coupler 250 (FIGS. 7 and 13).

The panel assembly 40, in a control system context, has a given panel length 503 and panel thickness 504, a given wrap tightness 505 and a weight 506. Panel length information is important for consistent control of shade-to-shade positioning. Thickness and wrap tightness relate to the wrap diameter at any measured number of turns of this roller, and weight relates to momentum and thus the stopping distance control.

The sensor control block 501 includes the potentiometer 330, its gears 350/351 and the flexible shaft or wire 360. In a control context, all of the components 330, 350, 351 and 360 contribute to the backlash in the system.

Finally, the controller 45 includes a user command processing circuit 520 which receives input signals from user command components such as the controls of FIGS. 18, 18a, 19 and 19a and/or other user command components. These commands, which will be described in more detail later, are connected to a ramp generator 521 which controls motion smoothness and stopping distance by ramping up and ramping down the panel velocity in a smooth controlled manner when starting and stopping the panel movement.

Controller 45 also contains a sensor signal processor 522 which receives the output signal from potentiometer 330, which is an analog signal related to the absolute position of the panel assembly. The sensor signal processor 522 filters the analog signal and produces an output signal which is connected to comparator 523 for comparison to a signal from ramp generator 521, the latter signal being developed from a user command signal. So long as the panel is not at the position required by the user command, the comparator 523 outputs an error signal that is processed by and coupled through a compensator circuit 524 to motor drive circuit 525 to drive the motor 215 at a speed determined by the ramp generator 521. Motor drive circuit 525 may include a circuit controlling a full H-bridge drive circuit that responds to a pulse width modulated signal supplied from compensator 524, in a manner enabling bidirectional control of the motor 215 from a single-sided power supply. The motor drive circuit 525 may comprise a motor controller of the type sold under part No. UDN-2954W, which provides current limiting for the motor 215 and dynamic braking of the motor 215, the dynamic braking being effected by shorting of the switching elements within the motor drive circuit (not shown) through which power is supplied to the motor 215.

The novel control system of FIG. 20 provides an open loop control for the panel assembly 40, and a closed loop control for subassemblies 45, 500 and 501 implemented by continuously sensing the absolute rotational position of the upper roller tube 110. The panel position sensing system is realized with a low cost linear analog to digital conversion technique which provides high resolution with only a few components, including a microprocessor and a timer input as will be described relative to FIG. 21. The system is insensitive to component variations and does not have to be trimed.

Figure 21:
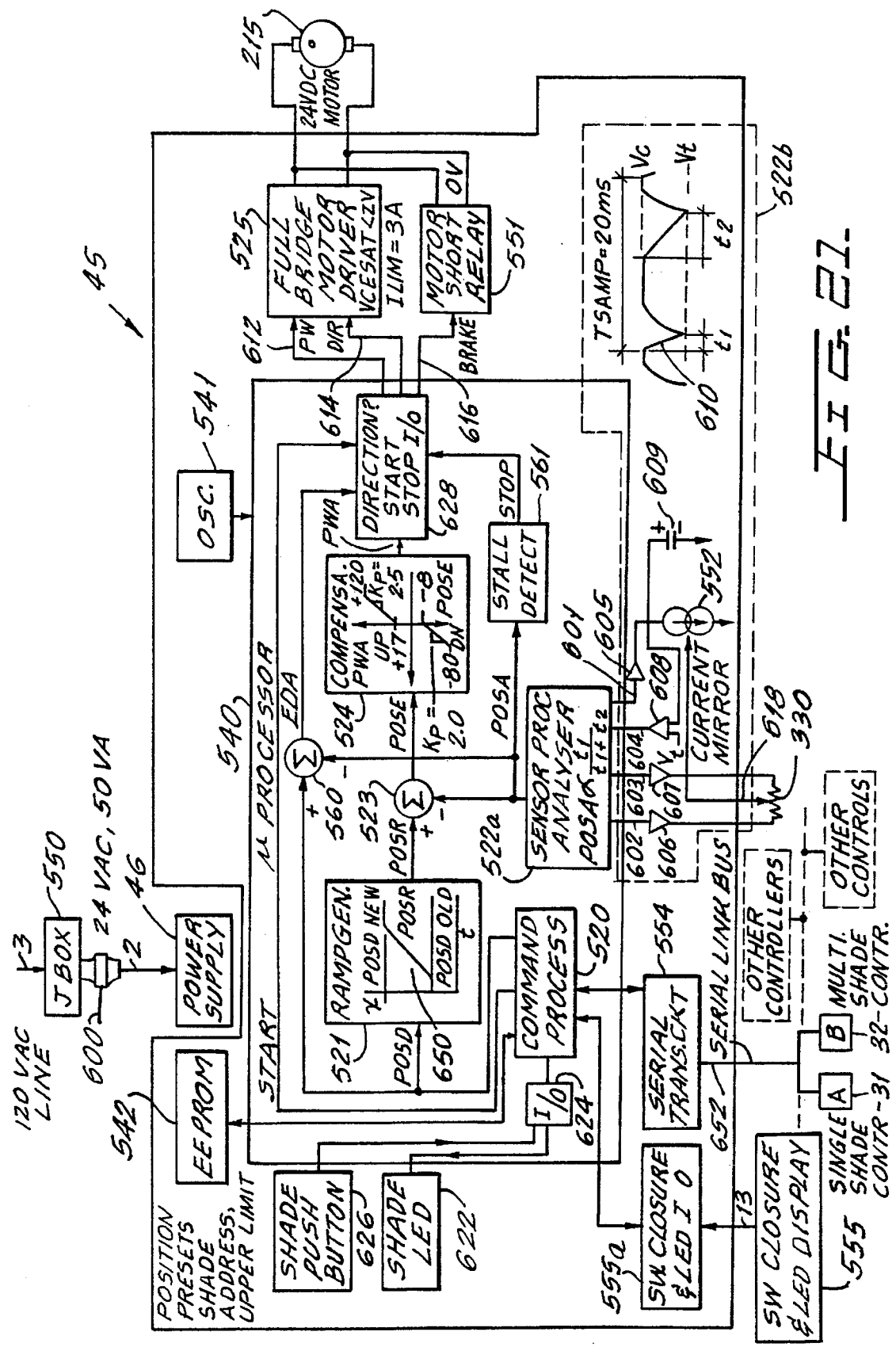
FIG. 21 is a more detailed block diagram of the controller of FIG. 20.

The controller 45 is shown in more detail in FIG. 21. Thus the controller employs a suitable microprocessor 540 which can, for example, be a type MC68HC705C8. Microprocessor 540 has a timing oscillator 541 connected thereto, which my be a 4 megahertz oscillator. All data regarding all panel assembly position presets, assembly addresses for multi-assembly systems and the panel assembly upper limit position are stored in a memory, preferably an EEPROM 542 which is connected to the command processing circuit 520 within the microprocessor 540. EEPROM 542 is a permanent or non-volatile type of memory which does not loose its data in the event of an interruption in power.

The full bridge motor driver 525 is connected to the output of microprocessor 540 to suitably drive the d-c motor 215. While not shown, it is apparent that the motor drive power is derived from the power supply 46 (FIGS. 1 and 17) which is, in turn, connected to the 120 volt a-c line, via a transformer 600. The transformer 600 transforms the a-c power from the 120 volt source to a 24 volt a-c source which is rectified and regulated within the power supply 46.

As further shown in FIG. 21, a normally closed motor shorting relay 551 that is connected across the motor 525 and is controlled by the brake signal 616 from the microprocessor 540 normally applies a zero voltage short across the motor terminals. This causes the motor 215 to act as a generator and to thereby exert on itself a strong braking force. The motor short is deactivated only when the microprocessor 540 outputs the motor driving signals over lines 612 and 614. Note that the braking force obtained with the relay 551 is more powerful than the dynamic braking force that can be obtained from the motor driver 525 because dynamic braking involves shorting of the motor terminals via transistor switching elements (not shown) whose saturation voltage is such that no braking is obtained once the motor speed has slowed down so that the back emf (electromagnetic force) has dropped to about 3–4 volts.

The sensor signal processor 522 includes the sensor processing analyzer 522a (comprised of the software incorporated within the microprocessor 540) and sensor circuitry 522b. The sensor circuitry 522b is interfaced to the potentiometer 330 and develops an output 604 that is coupled to the sensor processing analyzer 522a within the microproceesor 540.

The sensor circuitry 522b, which includes buffers 605, 606 and 607, a comparator 608, a capacitor 609 and a current mirror 552, operates as follows. Initially, all the buffers 605, 606 and 607 are set to a high impedance output state. Thereafter the buffer 605 is enabled momentarily via the microprocessor control line 601 for a time duration sufficient to cause the capacitor 609 to charge to a voltage $V_c$. The buffer 605 is thereafter disabled whereby the charge is retained in the capacitor 609.

Subsequently, the second buffer 606 is enabled through control line 602 causing a voltage output $V_c$ to appear at the output of the buffer 606. This establishes a current path to ground which flows through a portion of the potentiometer 330, the potentiometer wiper arm 618 and the current source 552. In well known manner, the current source 552 comprises a pair of transistors (not shown) in which, when a current is pushed through one of the transistors, an identical current is established in the other. That other transistor (not shown) is connected to the positive node of the capacitor 609, causing the capacitor to begin discharging linearly along the line 610 at a current identical to that in the potentiometer, eventually discharging sufficiently to reach a lower reference voltage $V_t$ (V threshold).

The reference voltage $V_t$ is connected to one node of the comparator 608. Thereby, when the capacitor voltage drops to $V_t$ the comparator output 604 to the microprocessor 540 will change its logic state. This output change is sensed by the microprocessor 540, enabling it to calculate the discharging period $t_1$ of the capacitor 609. Note that the discharge period is directly proportional to the portion of the resistance of the potentiometer 330 that is then located between the wiper arm 618 and the node connected to the output of the buffer 606.

The above process is then repeated except that the buffer 607 is energized, enabling calculating a time period $t_2$ which is proportional to the magnitude of the resistance of the potentiometer 330 located between the terminal thereof which is connected to the buffer 607 and the wiper arm 618.

Within the sensor processing analyzer 522a, the ratio $t_1$ divided by the sum of $t_1$ plus $t_2$ is calculated. This ratio represents the precise position of the wiper am 618 and therefore the absolute rotational position of the upper roller assembly 80 since, as has been previously described, the position of the wiper arm of the potentiometer 330 is directly proportional to the rotational position of the roller assembly 80.

It is possible to sample the position of the potentiometer 330 at least once every 20 milliseconds, which is more than sufficient for the purposes of the present invention in which the roller rotates at a maximum velocity of about 60 rpm. In effect, the above described circuit constitutes an analog to a digital conversion circuit which can be produced at very low cost, one that requires no voltage references and which is insensitive to minor component tolerances and requires no trickling. By taking the ratio $t_1$ divided by $t_1$ plus $t_2$, component tolerances and drift are inherently cancelled. A circuit of the type referred to above is described in the present assignee's, Lutron Electronics Co., Inc., U.S. Pat. No. 4,987,372, which issued Jan. 22, 1991.

The user command source in FIG. 21 consists of a single assembly control 31 or 631 (FIG. 18 or FIG. 18a) and/or a multiple assembly control 32 or 630 (FIG. 19 or FIG. 19a) which are coupled over a serial link bus 652 to the serial transceiver circuit 554, providing communication with the microprocessor 540.

Each of the controls 31, 32, 630 and 631 preferably comprises its own microprocessor and related memory and I/O components, shown in FIG. 24, as well as a set of operator controlled pushbuttons, switch(es) and indicator LEDs (FIGS. 18, 18a, 19 and 19a). The controller 45 my also be configured to respond to an operator controlled switch closure and LED display module 555 that is coupled to command processing circuit 520 via a switch closure and LED display interface 555a which generates appropriate commands for con, and processing circuit 520 depending on which switches were operated.

FIG. 24 illustrates the block diagram of a control 630 suitable for use with the controller(s) 45 of the present invention. Control 630 is connected to controller(s) 45 via serial link bus 652 which provides both communications and power. Multiple controls can be connected to serial link bus 652. The power distributed on serial link bus 652 is a preregulated DC voltage. Voltage regulator 802 provides a regulated 5 Vdc to power the control 630 and is protected against miswire by miswire and overvoltage protection circuit 804.

Microprocessor 800 (powered from the voltage regulator 802) controls all of the functions performed by the control 630. It is connected to serial link bus 652 via transceiver 808 which is protected by miswire protection circuit 810. Oscillator 814 provides timing signals for microprocessor 800. High Current Driver 820 provides the interface between microprocessor 800 and LED outputs 822 (LED's 57–61). Switch inputs 818 (from switches 50–56 and 634–640) are provided to microprocessor 800 via Electrostatic Discharge Protection circuitry 816. Memory 812 stores the control address, LED status and panel assembly lists. Memory initialization switch 806 is used during initial configuration of the control.

On initial start-up of the system or after a power outage, the microprocessor 800 performs a number of housekeeping tasks such as initializing its RAM memory and port lines and then updates the status of the LED indicator outputs 822, by sending the appropriate signal to High Current Driver 820 depending on the information in the LED status portion of Memory 812 which was previously stored prior to the outage.

In normal operation, microprocessor 800 reads the status of switch inputs 818 approximately every 10 ms, and determines which switches have been closed. This data is written to a switch status register. Microprocessor 800 then reads the switch status register and initiates serial link bus commands (i.e. it loads data into a transmit buffer to be sent as soon as the serial link bus is clear) depending on the data in the switch status register.

Typical commands are (1) Jog UP/DOWN, (2) Move UP/DOWN, (3) Stop, (4) Move to Preset, (5) Enter Configuration Mode, (6) Exit Configuration Mode or (7) Program a Preset, depending on which switches have been closed and for how long.

Microprocessor 800 then checks to see if serial link bus 652 is clear (i.e. no other control is sending a transmission) and initiates a transmission which is addressed in a sequential manner to all affected panel assembly controllers as determined from the panel assembly list in memory 812 (which is a list of the addresses of all the controllers which are controlled by a particular switch).

Microprocessor 800 next checks for any color, ends received from the serial link bus 652 via transceiver 808. These coupends may be (1) Panel Assembly Moving to Preset, (2) Panel Assembly at Preset, or (3) Add/Delete Panel Assembly from list of panel assemblies controlled. (Used during configuration.) Microprocessor 800 updates LED indicator outputs 822 to reflect the current panel assembly status and if it has changed then the new status of the LED indicator outputs is stored in memory 812 to be used in the event of a power outage to restore the status of LED indicator outputs 822 as described above.

Microprocessor 800 also checks the Memory initialization switch 806 which when set programs memory 812 to a "shipped from factory" condition in which no address is stored which allows the control address to be set via the switch inputs as described hereinafter.

Microprocessor 800 is also responsive to interrupts from the serial link bus 652 which may be (1) Transmission complete, (2) Receiving Complete, (3) Idle line detected, (4) Delay after idle time is complete. These interrupts allow the timing of signals sent on serial link bus 652 to be completely separate from the internal timing of individual devices connected to the serial link bus.

The operation of controls 31, 32 and 631 is substantially similar to the operation of control 630.

There are two types of communications which can be sent on serial link bus 652: a message (which is the result of an external action) and an acknowledgment (which is the result of a device receiving a message). Note that controllers acknowledge receiving messages (commands) from controls but controls do not acknowledge receiving messages (interrupts) from controllers.

If a control or a controller wants to communicate a message two conditions must be met:

1. An idle line must be detected (i.e. no signals are present on the serial link bus) and a delay equal to the control or controller "device address" multiplied by 128 µs must occur before transmission starts.

2. No activity on the serial link bus must occur up to the time that transmission begins.

In this way each device waits a unique period of time after an idle line is detected before beginning transmission since each device has a unique address and two devices will not attempt transmission at the same time. In this arrangement each device is a peer and is equal to all other devices in trying to access serial link bus 652 and there is no need to have a master device controlling communication on serial link bus 652, and the typical time for a given device to initiate transmission after attempting to do so is reduced.

Messages on the bus always include the address of the device to which the message is being sent, the address of the device sending the message and the command being sent.

In general, communications over the serial link bus 652 between the controls 31, 32, 630, or 631 and one or more of the controllers 45 proceeds in the basically conventional mode involving transmission of digital words/bytes which individually or in groups define commands and supply status data for the controls and the controllers, for example, by using standard hardware and protocols such as those associated with RS232 or 422 serial data channels.

In the preferred operation of the system, the LED status indicator next to each scene select (preset) button (FIGS. 18, 18a, 19 and 19a) will be illuminated as follows: If a LED is continuously on, the panel assembly 40 is in the designated position. A single flashing LED signifies that the panel is moving to a new position designated by the flashing LED.

If more than one LED is flashing then the system is in the configuration mode as described below.

The configuration mode for setting up a single or multiple panel assembly system operates in conjunction with a panel assembly indicator LED 622, a panel assembly pushbutton 626, and an I/O interface circuit 624.

The configuration mode enables configuring the system to relate a given panel assembly with a given control panel, optionally enabling one panel assembly to be controlled by more than one control panel and one control panel to control more than one panel assembly. The system also has a programming mode to enable programming the "presets" on the controls 31, 32, 630 or 631.

The panel assemblies and controls are normally configured at the factory and are ready to use without additional configuring. With reference to FIG. 19a, to change the configuration, steps 1–5 (see below) are carried out to configure the presets and master raise/lower switches 50/51 of the control 630 and steps 6–10 are carried out to configure the individual switches 630–640. Steps 11–14 are performed to program only the preset buttons 52–56. The aforementioned steps are:

Presets and Master Raise/Lower Switch Configuring

1. Press Presets 52 and 56 simultaneously on the control 630. The Preset Indicators 57 and 61 on the control will flash. The control sends out the first address on the serial link bus and waits for an acknowledgment. If no acknowledgment is received then the control labels itself with this address by storing it in memory 812. If an acknowledgment is received then the control sends out the second address, then the third address and so on until it finds the first available unused address, which is instead stored in memory 812.
2. Move the toggle down to close Master Lower switch 51. The Preset indicators on the control 630 will cycle sequentially. The control sends out the contend Enter Configuration Mode to all controllers, and sends a further command to each controller presently on the panel assembly list for the meter raise lower switch and presets which causes its panel assembly status indicator 622 to flash.
3. Look at the Panel Assembly Status indicator 622 at the top of each panel assembly. If the indicator is flashing, the panel assembly is controlled by the control 630.
4. To add a panel assembly to the group controlled by the control 630, press the panel assembly pushbutton 626 at the top of the panel assembly. The Panel Assembly Status indicator 622 will begin to flash. A panel assembly whose Panel Assembly Status indicator is flashing is removed from the group by pressing the panel assembly pushbutton 626 at the top of the panel assembly. The panel assembly status indicator 622 will extinguish. If a panel assembly pushbutton is pressed on a panel assembly whose status indicator is not flashing, the controller for that panel assembly first checks to determine if an address has been stored in its memory. If no address is found then it determines the first available unused address and stores it in memory as described above for step 1 in connection with the control. Once an address is stored in memory the controller sends a message on the bus addressed to all controls to add the panel assembly to the panel assembly list. Any control which is in configuration mode on receiving the message adds the address of that panel assembly to its panel assembly list for the master raise lower switch and presets. Similarly, pressing a panel assembly pushbutton on a panel assembly whose status indicator is flashing causes the controller for that panel assembly (which must previously have assigned itself an address) to send a message addressed to all controls to delete the panel assembly from the panel assembly list for the master raise lower switch presets. Any control which is in configuration mode on receiving the message deletes the address of that panel assembly from its panel assembly list for the master raise/lower switch and presets.
5. Move the toggle up to close the Master Raise switch 50 on the controller to complete the procedure. The control sends out the command Exit Configuration Mode to all controllers, and all Panel Assembly Status Indicators are lit continuously.

Individual Raise/Lower Toggle Switch Configuring

6. Press Presets 52 and 56, simultaneously, on the control panel to be programmed. The Preset Indicators 57 and 61 on the control panel will flash.
7. Operate one of the four Individual Raise/Lower switches 634–640. Two Preset indicators on the control panel will flash. The control sends out the command Enter Configuration Mode to all controllers, and sends a further command to any controller already on the panel assembly list for the individual raise lower switch 634–640 which was operated, which causes its panel assembly status indicator 622 to flash.
8. Look at the Panel Assembly Status Indicator 622 at the top of each panel assembly. If the indicator is flashing, the panel assembly is controlled by this Individual Raise/Lower switch.
9. To add a panel assembly to the group controlled by the raise/lower switch, press the panel assembly button 626 at the top of the panel assembly. The Panel Assembly Status Indicator 622 will begin to flash. To remove a panel assembly from the group, press the panel assembly button 626. The panel assembly status indicator 622 will extinguish. In this way panel assembly addresses are added to or deleted from the panel assembly list for the individual raise lower switch 634–640 which was operated in a manner similar to that described above in connection with step 4 for the master raise/lower switch and presets.
10. Move the toggle up to close Master Raise switch 50 on the control 630 to complete the procedure. The control sends out the command Exit Configuration Mode to all controllers, and all panel assembly status indicators are lit continuously. Steps 6 through 10 are repeated for the other individual raise/lower switches.

Programming Control Panel presets

NOTE: Presets should be programmed after system is configured correctly.

The five Presets on the control 630 will select previously chosen panel assembly settings. These settings can be changed using the following simple steps.

11. Set panel assemblies to the desired setting, i.e. positions using the
Individual Raise/Lower switches 634–640 or the Master Raise/Lower switches 50/51.
12. Press Preset 52 and Preset 56, simultaneously, on the control 630 you wish to program. The Preset indicators 57 and 61 will begin to flash.
13. Press the Preset that you wish to assign no this "panel assembly setting". The Preset Indicator will light indicating that Preset is now selected. The control sends out the command "Program a Preset" to each controller on the panel assembly list for the master raise/lower switches and presets. Each of the controllers receiving this command stores the present setting of position sensor 310 in memory 542 in association with the preset programmed. The controller then sends the message to the control "Panel Assembly at Preset", which the control responds to by lighting the appropriate preset indicator.

14. Repeat these steps for other presets you wish to program.

In normal (non-configuration/programming) operation of the system, the operation of control 630 is as follows.

a) If a preset button (52–56) is pressed then the control sends a command to each controller on the panel assembly list for the master raise/lower switch and presets to Move to a preset.

The controllers respond by moving their panel assemblies as described in more detail below and sending a message Panel Assembly Moving to Preset. The control 630 responds to this message by flashing the appropriate preset indicator LED. When the panel assemblies reach the desired preset position the controllers send a message Panel Assembly at Preset. The control 630 responds by lighting the appropriate preset indicator LED continuously, providing positive feedback that the preset position has been reached.

b) If a raise/lower switch, e.g. 50/51, 634–640 is operated, micro-processor 800 determines from the switch status register whether to send a Jog Up/Down, a Move Up/Down or a Stop command, to each controller on the panel assembly list for the switch which was operated.

When a switch is first operated a Jog Up or a Jog down command is sent depending on whether a raise or a lower switch was operated.

If a switch is operated for more than 600 milliseconds then a Move Up or a Move Down command is also sent, depending on whether a raise or a lower switch was operated. Once the switch is returned to a neutral position a Stop command is send.

Other alternate types of controls for example receivers for remote wireless controls, light sensors, temperature sensors, timeclocks (such as an astronomical timeclock), centralized energy management or building control systems, wind speed detectors, occupancy detectors and the like can be used in place of controls 31, 32, 631 and 630 or in addition to them and can be connected to serial link bus 652 via an interface circuit.

The interface circuit is similar to the control circuit illustrated in FIG. 24, except that the switch inputs 818 are provided by switch closures within the other types of controls. These switch closures are coupled to microprocessor 800 through isolation and protection circuitry. If desired an additional high current driver 820 can also be provided to drive displays on the other types of controls listed above. Switch inputs 818 are used during the configuration and programming of the interface circuit in a similar manner to that described above for control 630.

The other types of controls generate switch closures which cause the panel assembly to move to a preset position or to move up or down as long as the switch closure is maintained.

For example, a timeclock could generate a switch closure at a particular time, say 7:00 a.m. each morning which selects the preset assigned to a panel with 100% light transmittance, hence allowing daylight into a bedroom, if the panel assembly covered a bedroom window.

In another application it might be desired to maintain the light level in a daylighted space within a certain range selected within the alternate control. The actual light level could be measured with a light sensor and a "raise" switch closure generated if the space was too dark and a "lower" switch closure generated if the space was too bright for the selected range.

If the panels in the associated panel assembly in front of the windows admitting daylight were of increasing light transmittance with the panel with the greatest transmittance at the bottom and with the least transmittance at the top, the panel assembly would move in response to the switch closure until the light passing through the panel assembly gave the desired light level in the space, at which time the "raise" or "lower" switch would open and the panel assembly would stop.

Alternatively, a particular panel preset could be selected via a switch closure in response to the actual light level measured in the room prior to moving the panel assembly, which would be of an appropriate transmittance to provide the selected light level.

In a further application the panel assembly might be made up of various insulating or reflecting panels and instead of measuring the light level in the space the temperature could be measured, and the appropriate panel to create the desired temperature could be brought in front of the window, by the appropriate switch closure being provided within the alternate control. In this way the energy required to heat or cool the space could be reduced.

In operation, the command processing circuit 520 of the microprocessor 540 outputs a signal POSD (desired position) and a START signal. The ramp generator 521 produces from the POSD signal an output signal POSR (ramp position). That signal is supplied to the comparator 523 which produces an output POSE (error position) whose magnitude is the difference between the POSR signal and the signal POSA (actual position) being outputted by the sensor signal processor 522.

Each of the signals POSR and POSA is formatted as an absolute rotational position (ramp or actual) of the upper assembly 80. Their difference, represented by the signal POSE, is provided as an input to the compensator 524 which develops a signal PWA which is in the form of a pulse width modulated signal having a duty cycle that depends on the magnitude of the error signal POSE. The proper duty cycle corresponding to the PWA signal is supplied to the motor 215, via the Direction/Start/Stop/I/O Interface 628 and motor driver 525.

The Direction/Start/Stop/I/O Interface 628 also receives the START signal from the command processing circuit 520, the EDA (error between desired and actual positions) signal from the comparator 560, and a STOP signal from the stall detector 561. The stall detector 561 continuously takes, mathematically speaking, the derivative of the signal POSA to ensure that POSA is constantly changing, as it would, as long as the motor 215 continues to rotate. If the signal POSA does not change sufficiently in magnitude within a given time, the motor 215 has most probably stalled and the STOP signal is outputted.

The EDA signal from the comparator 560 is developed as the difference between the signal POSD (desired position) and the signal POSA (actual position) which represents the instantaneous upper roller position. The EDA signal is activated when the POSD and POSA signals are equal to one another, i.e. their difference is zero. Taking into account the status of the START, STOP and EDA signals, the Direction/Start/Stop/I/0 Interface 628 will either permit or inhibit the signal PWA of the compensator 524 to be applied to the motor driver 525. For example, if a motor stall is detected, the PW signal 612 to the motor driver 525 is inhibited. This also occurs if the EDA signal has been activated and the duty cycle of the signal PWA has been sufficiently small as to assure that the shade will stop relatively instantly.

The functions of and the interplay between the ramp generator 521, the compensator 524, and the sensor processing analyzer 522a will now be described in greater detail. Typically, the upper roller assembly 80 will be at a given position when a user command will be received requesting a new position, designated by the signal POSD. To assure smooth movement of the panel system, the ramp generator 521 initially sets its output POSR to a value which is only slightly different than the present position of the roller, designated by POSA. Thereafter, the signal magnitude of POSR is gradually increased until it reaches the requested position value POSD. This is illustrated by the curve 650 depicted within the ramp generator block of FIG. 21.

Hence, initially the values of POSR and POSA will be close to one another producing a small valued error signal POSE. With reference to the plot depicted within the block representing the compensator 524, note that the pulse width signal PWA has a duty cycle the magnitude of which increases with increasing values of the error signal POSE. In other words, the greater the error the greater the pulse width and, therefore, the greater the speed at which the motor 215 is driven.

In this manner, the combination of the ramp generator 521, the compensator 524 and the output from the sensor processing analyzer 522a provides a closed loop circuit which enables very exact and smooth up and down ramping of the speed of the motor 215. Note that the transformation curves located to the right and to the left of the vertical coordinate axis in the graph of the compensator 524 designate and show that different transformation functions are used to convert the error signal (POSE) to a pulse width based on whether the panel assembly is being raised or lowered. This is necessary because the spring 160 of the lower roller assembly 81 and gravity favor downward motion. Therefore, the pulse width versus the error signal POSE curve is not symmetric for up and down motion. Also note that minimum pulse widths (for slow motion of the panel assembly) depend on the position of the panel assembly. As the panel assembly moves up, the upper roller diameter increases and the lower roller spring torque increases. This too causes the panel assembly to favor downward movement and the minimum pulse widths are adjusted with panel assembly position to compensate. Panel assembly size and normal wear also affect minimum pulse widths and this too my be taken into consideration within the compensator 524.

With the above described control system, the controller 45 is capable of developing panel assembly motion profiles as are depicted in FIGS. 22 and 23. FIG. 22 shows the motion profile which is preferred for the operation of the controller of FIG. 21 for a simple raise or lower motion, using control buttons 50 and 51 of FIGS. 18 and 19. FIG. 23 depicts the panel assembly motion profile which is obtained in response to pressing any of the preset buttons 52-56.

With reference to FIG. 22, if it is desired to move or "jog" the panel assembly only a very short distance, the push button my be held depressed for from 40 to 600 milliseconds. This jog is shown at the beginning of interval "A" of FIG. 22.

If the button is held depressed from 600 milliseconds to 1,600 milliseconds, the microprocessor will, as shown in FIG. 22 (regions A and B), first jog, then delay and stand still for a 600 millisecond delay, and then move with a linear ramp-up speed, and then stop with the motor braked when motion stops.

If the button is held depressed from 1.6 seconds to 2.6 seconds, the microprocessor will call for the operations of intervals "A", "B" and "C", and cause a jog, a 600 millisecond delay, a linear ramp up of speed for up to two seconds and then a linear ramp down of speed for up to one second.

Finally, if the button is held depressed for longer than two seconds, the system will jog, then delay for 600 milliseconds, then ramp up in speed for two seconds, then run at constant speed, and, with release of the button, ramp down for one second to a stop and brake.

The motion profile commanded by the control circuit of FIG. 21 for preset operations is shown in FIG. 23. Thus, if preset button 52 is depressed and the panel assembly is in the "cloth" position of button 55, the motor 215 will be driven to raise the panel assembly, with a motion profile dependent on the distance to be travelled. For the example given, the motor would ramp up for two full seconds, and then rotate at a constant speed until the panel assembly is about 18 inches from its desired position. The motor velocity is then ramped down over about a two second interval to stop and be braked at the preselected panel assembly or home position.

FIG. 23 shows two intermediate preset positions which could have been called for, to be reached in two seconds and four seconds respectively. Note that when a preset button is pressed, its corresponding LED will flash until the preset position is reached.

The novel control system of the invention provides fast motion of the panel assembly, with a 60 RPM roller speed, with very smooth control because of the ramp velocity start and stop functions. The jog capability permits fine position adjustment. Furthermore, in multiple panel assembly systems, the panel assemblies track one another (stay aligned) when given the same input, even after a large number of moves.

This ability of the different panel assemblies in a multiple panel assembly system to track one another is achieved by the manner in which the movement of the panel assemblies to a desired position is referenced.

As described above, the desired position of a panel assembly in response to the pressing of a preset button can be programmed. Essentially what occurs during programming is that the setting of potentiometer 330 is stored in memory 542, for each of the panel assembly positions associated with each of the preset buttons.

When a particular preset button is pressed, the controller causes the motor to move the panel (using the motion profile illustrated in FIG. 23) until potentiometer 330 has the desired setting regardless of the position of the panel assembly prior to the move. Hence any error in position after the move will remain small as compared to an alternate control scheme where the motor was controlled based on the difference between the potentiometer setting prior to the move, and the desired potentiometer setting in the new preset position. In this alternate control scheme any errors in panel assembly position will accumulate each time the panel assembly is moved.

Since errors in the position of each panel assembly in a multiple panel assembly system do not accumulate, the error in the relative positions of different panel assemblies of the system will also remain small and the panel assemblies will track one another without the necessity to have communication between the controllers for the different panel assemblies.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of labelling a device connected to a data bus with a unique device address, in a system comprising a plurality of devices operating on a peer basis, the method comprising the steps of:

a) sending out a first trial address from said device and waiting for an acknowledgment from any other device connected to said data bus with a device address which is identical to said first trial address;

b) if an acknowledgment is received from any other device, sending out a subsequent, different, trial address and waiting for an acknowledgment from any other device with a device address which is identical to said subsequent trial address; and c) if an acknowledgment is received, repeating step b), otherwise labelling said device with said unacknowledged address as its unique device address;

wherein said device is a component in a panel system arrangement comprising at least one elongated panel assembly including a plurality of panels following one another along the length of said panel assembly, said panels being configured to provide various aesthetic, light transmitting, or environment controlling characteristics;

first and second spaced rollers, said panel assembly having first and second ends respectively secured to said first and second rollers and being selectively windable onto one or the other of said roller in a manner enabling any said panel or portion thereof to be positioned between said rollers; and control means effective for automatically positioning any one of said panels that has been selected via a selection device between said rollers.

2. A method of labelling a device connected to a data bus with a unique device address, in a system comprising a plurality of devices operating on a peer basis, the method comprising the steps of:

a) sending out a first trial address from said device and waiting for an acknowledgment from any other device connected to said data bus with a device address which is identical to said first trial address;

b) if an acknowledgment is received from any other device, sending out a subsequent, different, trial address and waiting for an acknowledgment from any other device with a device address which is identical to said subsequent trial address; and c) if an acknowledgment is received, repeating step b), otherwise labelling said device with said unacknowledged address as its unique device address;

wherein said device accesses said data bus following a unique time delay after an idle line state of said data bus is detected, said time delay being related to said unique device address after said device has been labelled therewith.

* * * * *